United States Patent
Bovalino, III et al.

(10) Patent No.: US 10,999,074 B2
(45) Date of Patent: May 4, 2021

(54) DUAL-TOKEN AUTHENTICATION FOR ELECTRONIC DEVICES

(71) Applicant: Apple Inc., Cupertino, CA (US)

(72) Inventors: Carmen A. Bovalino, III, San Francisco, CA (US); Shyam S. Toprani, Los Altos, CA (US); George Lin, San Jose, CA (US); Yin Shun Osborn Chan, Fremont, CA (US); Anush G. Nadathur, Campbell, CA (US); Dennis Mathews, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 16/051,040

(22) Filed: Jul. 31, 2018

(65) Prior Publication Data
US 2020/0044849 A1 Feb. 6, 2020

(51) Int. Cl.
*H04L 9/32* (2006.01)
*H04L 9/08* (2006.01)
*H04L 29/06* (2006.01)

(52) U.S. Cl.
CPC .......... *H04L 9/3213* (2013.01); *H04L 9/0861* (2013.01); *H04L 63/062* (2013.01); *H04L 63/067* (2013.01); *H04L 63/0892* (2013.01)

(58) Field of Classification Search
CPC ... H04L 9/3213; H04L 9/0861; H04L 63/062; H04L 63/067; H04L 63/0892
See application file for complete search history.

(56) References Cited

U.S. PATENT DOCUMENTS

| 5,917,168 A | 6/1999 | Nakamura et al. |
| 8,504,824 B1 * | 8/2013 | Abbott ............... H04L 63/0838 713/159 |

(Continued)

FOREIGN PATENT DOCUMENTS

| CN | 103491084 A | * | 1/2014 |
| CN | 103491084 A | | 1/2014 |

OTHER PUBLICATIONS

Arif Mohammad Abdul, et al., Dual factor authentication to procure cloud services, Dec. 22-24, 2016, 2016 Fourth International Conference on Parallel, Distributed and Grid Computing (PDGC), pp. 1-5.*

*Primary Examiner* — Farid Homayounmehr
*Assistant Examiner* — Suman Debnath
(74) *Attorney, Agent, or Firm* — Kilpatrick Townsend & Stockton LLP

(57) ABSTRACT

An authentication process for an endpoint device uses a pair of tokens. Tokens are generated at an authentication server that maintains a data store of token states, where the states are defined to include a "normal" state sequence along which a token is expected to advance. The endpoint device can store a token pair in non-volatile local storage. To authenticate, the endpoint device can provide its stored token pair to the authentication server, which can determine whether authentication succeeds based on the states of the tokens in the token pair. After successful authentication, the authentication server can provide a new token pair to the endpoint device and advance the token states along the normal sequence. When the endpoint device confirms receipt of the new token pair, which replaces the previous token pair, the authentication server can advance the state of the tokens again.

14 Claims, 15 Drawing Sheets

(56) References Cited

U.S. PATENT DOCUMENTS

| | | | |
|---|---|---|---|
| 9,674,158 B2* | 6/2017 | Korondi | H04L 9/0618 |
| 9,830,445 B1 | 11/2017 | Machani | |
| 9,965,797 B1* | 5/2018 | Poole | G06Q 30/0623 |
| 10,109,375 B1* | 10/2018 | Paris, III | G16H 10/20 |
| 10,110,582 B2* | 10/2018 | Sabiwalsky | H04L 63/062 |
| 10,565,364 B1* | 2/2020 | Asefi | G06F 21/45 |
| 2004/0064434 A1* | 4/2004 | Sampson | G06Q 20/04 |
| 2004/0073621 A1* | 4/2004 | Sampson | G06Q 20/12 |
| | | | 709/209 |
| 2006/0288405 A1 | 12/2006 | Albisu et al. | |
| 2009/0113543 A1* | 4/2009 | Adams | H04L 9/3234 |
| | | | 726/18 |
| 2010/0142711 A1* | 6/2010 | Weis | H04L 9/0833 |
| | | | 380/277 |
| 2010/0235284 A1* | 9/2010 | Moore | G06Q 20/40 |
| | | | 705/75 |
| 2011/0213969 A1* | 9/2011 | Nakhjiri | H04L 9/3213 |
| | | | 713/158 |
| 2012/0167185 A1* | 6/2012 | Menezes | H04L 63/0815 |
| | | | 726/5 |
| 2014/0368312 A1 | 12/2014 | Robshaw | |
| 2015/0236908 A1* | 8/2015 | Kim | H04L 63/0846 |
| | | | 709/221 |
| 2015/0312038 A1* | 10/2015 | Palanisamy | G06F 21/33 |
| | | | 713/155 |
| 2016/0364555 A1* | 12/2016 | Child | G06F 21/6218 |
| 2017/0127276 A1* | 5/2017 | Koo | H04L 9/3226 |
| 2017/0214683 A1* | 7/2017 | Kroehling | H04L 63/0807 |
| 2017/0235964 A1* | 8/2017 | Beiter | H04L 9/0643 |
| | | | 713/193 |
| 2017/0331806 A1* | 11/2017 | Sabiwalsky | H04L 63/18 |
| 2018/0091506 A1* | 3/2018 | Chow | G06Q 20/145 |
| 2018/0191700 A1* | 7/2018 | Kong | H04L 41/046 |
| 2018/0295556 A1* | 10/2018 | Baek | H04L 63/306 |
| 2019/0058697 A1* | 2/2019 | Chang | H04L 63/0428 |
| 2019/0097802 A1* | 3/2019 | Rowe | H04L 9/3213 |
| 2019/0312730 A1* | 10/2019 | Engan | H04L 9/3213 |
| 2019/0363886 A1* | 11/2019 | Atwood | H04W 12/00512 |

* cited by examiner

*800*

| State | Last Event |
|---|---|
| Vended | Token generated and provided to endpoint (or provisioning server) |
| Registered | Receipt of token by endpoint device confirmed (by endpoint device or provisioning server) |
| Exhausting | Endpoint used Registered or Vended token in successful authentication |
| Exhausted | While token was in Exhausting state, endpoint confirmed receipt of subsequent token |
| Null | (Valid null token) |
| Revoked | Token invalidated by authentication manager |
| Destroyed | Token error/destruction reported by provisioning server |

*FIG. 8A*

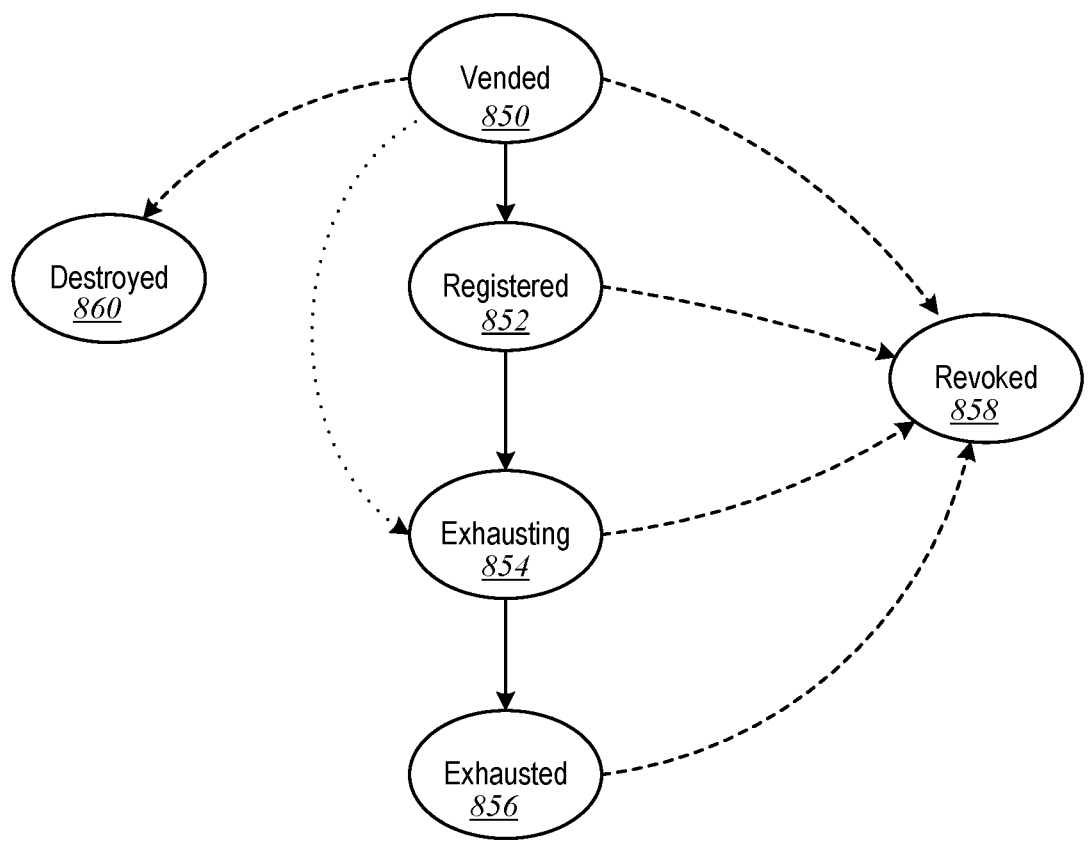

| RECEIVED STATES | | NEW STATES | |
|---|---|---|---|
| $T_n$ | $T_{n-1}$ | $T_n$ | $T_{n-1}$ |
| Registered | Null | Exhausting | Null |
| Registered | Exhausted | Exhausting | Exhausted |
| Vended | Exhausting | Exhausting | Exhausted |
| Exhausting | Exhausted | Exhausting | Exhausted |

| RECEIVED STATES | | NEW STATES | |
|---|---|---|---|
| $T_{n+1}$ | $T_n$ | $T_{n+1}$ | $T_n$ |
| Vended | Exhausting | Registered | Exhausted |
| Registered | Exhausted | Registered | Exhausted |

DUAL-TOKEN AUTHENTICATION FOR ELECTRONIC DEVICES

BACKGROUND

The present disclosure relates generally to authentication of electronic devices and in particular to dual-token authentication for electronic devices.

Authentication, in the context of electronic devices, is a process by which one electronic device (referred to herein as the endpoint) provides "proof" to another electronic device (referred to herein as the grantor) that it is what it purports to be. The proof can take various forms. One common form is public-key authentication, which generally relies on a digital certificate that contains a public key for which the endpoint device holds the corresponding private key. The grantor device obtains the digital certificate for an endpoint device (e.g., from a trusted certificate authority) and send a challenge, e.g., a random bit sequence, to the endpoint. The endpoint signs the challenge using its private key, and the grantor verifies the signature using the public key extracted from the digital certificate. This process relies on the grantor trusting that the digital certificate is valid.

Providing endpoint devices with individual digital certificates in a secure manner (such that the certificates can be trusted) can be a challenge in some contexts. For instance, where the number of endpoint devices is very large, a correspondingly large-scale operation is required to generate a certificate for each device. As another example, some types of endpoint devices may be simple devices with limited computing capability and limited power consumption, such as lamps or switches or the like that may be designed for inclusion in a "smart" environment where they would be remotely controlled by a grantor device. In such devices, it may not be desirable to build in the capability to perform cryptographic operations (e.g., digitally signing a challenge). Accordingly, alternative authentication schemes would be desirable.

SUMMARY

Certain embodiments of the present invention relate to authentication in a computer system using a pair of tokens (also referred to herein as a token pair) that, at any given time, includes a "newer" token and an "older" token. The tokens are generated at an authentication server that maintains a data store of token states in which, at any given time, each token has an assigned state that reflects transactions or events involving that token that have occurred at the authentication server. The states are defined to include a "normal" state sequence along which a token is expected to progress (unless some error occurs). The authentication server can vend new tokens to a trusted provisioning server, which can provision an endpoint device with an initial token pair. The endpoint device can store its token pair in non-volatile local storage. To authenticate an endpoint device to a grantor device, the endpoint device can provide its stored token pair to the grantor device. The grantor device can send the token pair to the authentication server. The authentication server can receive the token pair, check the state of each token, and determine whether the two tokens together are in a valid pair state. Based at least in part on this determination, the authentication server can update the states of the tokens in the received token pair and send a response to the grantor device indicating whether authentication succeeded or failed. In the event of successful authentication, the authentication server can also generate a new token for the endpoint device. Each time the endpoint device receives a new token, it can replace the older token in its stored token pair with the new token and provide a confirmation to the authentication server; the confirmation can include the currently-stored token pair. The authentication server can update the token states to indicate that receipt was confirmed. Accordingly, the state of a token can indicate whether it has been sent to an endpoint device, received by an endpoint device, and used in authentication. By relying on the token states, the authentication server can limit re-use of tokens for authentication while allowing an endpoint device to recover from communication errors.

The following detailed description, together with the accompanying drawings, will provide a better understanding of the nature and advantages of the claimed invention.

BRIEF DESCRIPTION OF THE DRAWINGS

FIG. 8A shows a table listing a set of possible token states that can be defined according to an embodiment of the present invention.

FIG. 8B shows a state diagram indicating transitions that may occur among the states listed in FIG. 8A according to an embodiment of the present invention.

FIG. 10 shows a table of token state updates that can occur in response to successful authentication according to an embodiment of the present invention.

FIG. 11 shows a similar table of state updates that can occur in response to an endpoint device confirming receipt of a new token after successful authentication according to an embodiment of the present invention.

DETAILED DESCRIPTION

Figure 1:
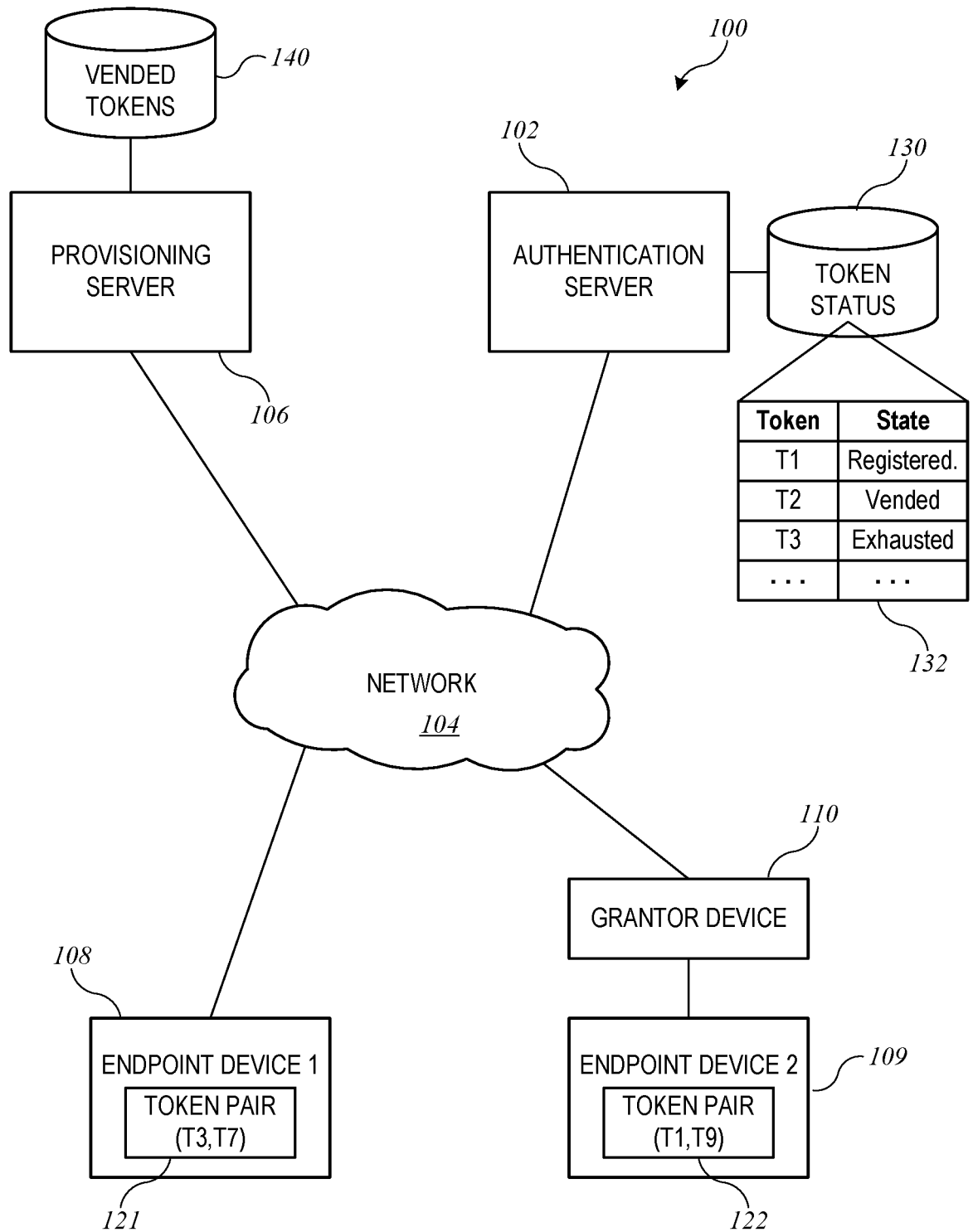
FIG. 1 is a simplified block diagram of a system supporting authentication of electronic devices according to an embodiment of the present invention.

FIG. 1 is a simplified block diagram of a system 100 supporting authentication of electronic devices according to an embodiment of the present invention. System 100 can include an authentication server 102 connected to a network 104 (e.g., the Internet). Also connected to network 104 are a provisioning server 106 and one or more electronic devices including endpoint devices 108, 109 and grantor device 110.

Each of endpoint devices 108, 109 can be any type of electronic device that is capable of communicating with other electronic devices. In some embodiments, endpoint devices 108, 109 can be "smart home" devices that are controllable by a user via an application program (app) executing on a mobile phone or other user-operable controller device. Examples include lamps, electrical switches, fans, thermostats, refrigerators, ovens, door locks, cameras, and so on. In some embodiments, some endpoint devices (e.g., endpoint device 109) may be connected to network 104 only via grantor device 110. Other endpoint devices (e.g., endpoint device 108) may be able to connect to network 104 independently of a grantor device, and such devices can perform a modified version of authentication operations as described below. As will become apparent, authentication operations as described herein can be performed with any electronic device that is able to send information to and receive information from servers such as authentication server 102 and provisioning server 106. The term "endpoint device" is used herein to designate any electronic device that is to be authenticated using an authentication server such as authentication server 102.

Grantor device 110 can be any electronic device that is capable of interoperating with one or more endpoint devices 108, 109. For example, grantor device 110 can be a user-operable device such as a mobile phone, tablet computer, laptop computer, desktop computer, wearable computing device, media-streaming device, or the like, and grantor device 110 may be operable as a remote control device to control operations of endpoint devices 108, 109. The term "grantor device" is used herein to designate any electronic device that uses an authentication server such as authentication server 102 to authenticate an endpoint device.

For purposes of the present description, it is assumed that grantor device 110 is configured to authenticate endpoint devices 108, 109 (e.g., as a condition of allowing interoperation). It is also assumed that grantor device 110 has established mutual trust with authentication server 102 such that grantor device 110 relies on the result of authentication operations performed by authentication server 102.

According to some embodiments of the present invention, authentication of an endpoint device (such as either of endpoint devices 108, 109) relies on a dual-token validation process using tokens that are generated by authentication server 102 and transmitted (or vended) to endpoint devices 108, 109, which can store the received tokens, e.g., as token pairs 121, 122. As described below, each of token pairs 121, 122 can be a structured data object that includes two distinct tokens. In some embodiments, the two tokens in token pair 121 (or 122) may be stored by endpoint device 108 (or 109) at two different times such that one token is "older" and the other is "newer." In other embodiments, endpoint device 108 (or 109) can treat its token pair 121 (or 122) as a single data object. Authentication server 102, which can be the ultimate source of all tokens used for authentication, can maintain a token status data store 130. Token status data store 130 can include a token state table 132 (e.g., a lookup table or similar data structure) that persistently stores state information for each token that authentication server 102 has generated.

When grantor device 110 desires to authenticate endpoint device 109 (or endpoint device 108), grantor device 110 can obtain token pair 122 (or token pair 121) from endpoint device 109 and provide token pair 122 to authentication server 102. Authentication server 102 can extract the individual tokens (e.g., T1 and T9) from token pair 122 and access token state table 132 to determine the states of tokens T1 and T9. (Specific examples of token states are described below.) If the two tokens' states together correspond to a valid "pair state," authentication server 102 can update the state of the two tokens using update logic that advances the token states according to a "normal" state sequence, generate a new token, add the new token to token state table 132 in an appropriate initial state, and provide an authorization message to grantor device 110. The authorization message can include the new token (or a new token pair). Grantor device 110 can provide the new token (or new token pair) to endpoint device 109, which can update token pair 122 to replace the older token with the newly received token (or replace the previously stored token pair with the new token pair) Endpoint device 109 can confirm receipt of the new token to grantor device 110, which can relay the confirmation to authentication server 102. Based on the confirmation, authentication server 102 can update the states of the tokens corresponding to updated token pair 122, advancing the token states along the normal sequence. As described below, confirmation of receipt of a new token by an endpoint device can facilitate recovery from communication errors that may occur.

This authentication process assumes that endpoint devices 108, 109 have token pairs 121, 122 that include tokens listed in token state table 132. As noted, the token pair for a given endpoint device can be updated each time the endpoint device authenticates. However, to enable a first authentication for a new endpoint device, it is necessary to provision the endpoint device with an initial token pair that has a valid state in token state table 132. Accordingly, some embodiments of the present invention provide techniques for provisioning an endpoint device with an initial token pair. For instance, provisioning server 106 may be operated by a manufacturer of endpoint devices such as endpoint device 108. Provisioning server 106 can communicate with authentication server 102 to request one or more new tokens. In response to a request, authentication server 102 can generate the requested number of tokens, add the new tokens to token-state lookup table 132, and provide the new tokens to provisioning server 106. Provisioning server 106 can store received tokens in a vended tokens data store 140. Thereafter, provisioning server 106 can provide an initial token pair from vended tokens data store 140 to endpoint device 108, e.g., as part of a firmware update or an in-factory device provisioning process; endpoint device 108 can store the initial token pair so that it is ready to authenticate. In some embodiments, the initial token pair can include one of the tokens from vended tokens data store 140 (as the designated newer token) and a special "null" token as the older token. As described below, the null token can be a reusable token that can be shared by any number of endpoint devices. All other tokens can be unique tokens that are not reused.

It will be appreciated that system 100 is illustrative and that variations and modifications are possible. Any number of endpoint devices may be supported, and any number of grantor devices may communicate with the endpoint devices. An endpoint device can authenticate with multiple grantor devices. The connection between a particular grantor device and a particular endpoint device can be a point-to-point connection (e.g., using Bluetooth or a wired connection or the like) or via a network (e.g., both devices can be joined to the same Wi-Fi network, or they may communicate via the Internet or other wide-area or local-area network). In some embodiments, communications between various devices may take place using a secure channel that can be established using various techniques, including conventional techniques.

Figure 2:
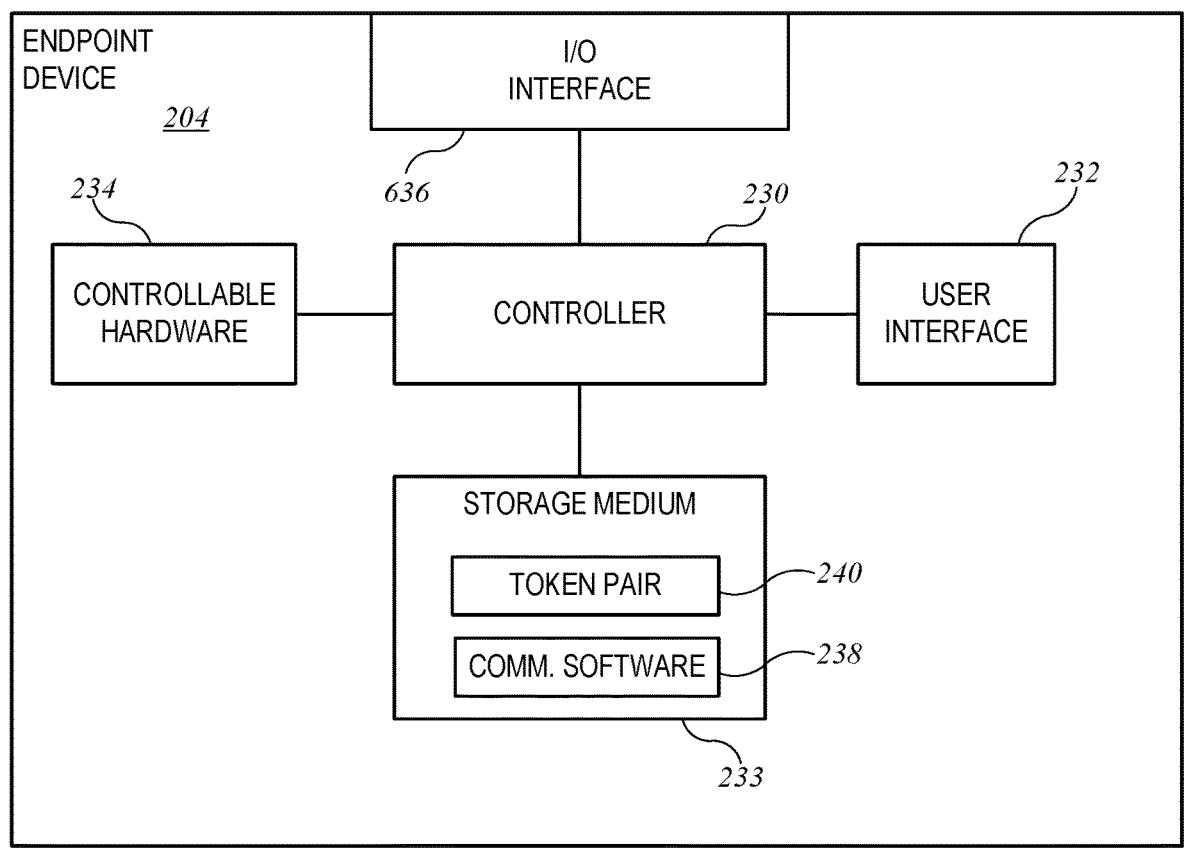
FIG. 2 is a simplified block diagram of an endpoint device according to an embodiment of the present invention.

FIG. 2 is a simplified block diagram of an endpoint device 204 according to an embodiment of the present invention. Endpoint device 204 (e.g., implementing any of endpoint devices 108, 109 of FIG. 1) can include controller 230, user interface component(s) 232, storage medium 233, other accessory-specific hardware 234, and input/output (I/O) interface 236. Endpoint device 204 is representative of a broad class of user-operable devices that may be authenticated using techniques described herein, and such devices can vary widely in capability, complexity, and form factor. Various endpoint devices may include components not explicitly shown in FIG. 2, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Controller 230 can include, e.g., one or more single-core or multi-core microprocessors and/or microcontrollers executing program code to perform various functions associated with endpoint device 204. For example, where endpoint device 204 incorporates a user-operable control, controller 230 can interpret user operation of the control and responsively invoke functionality of endpoint device 204; in some instances, the invoked functionality can include sending information to and/or receiving information from other devices (such as grantor device 110) of FIG. 1.

User interface 232 can include user-operable input components such as a touch pad, touch screen, scroll wheel, click wheel, dial, button, switch, keypad, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular endpoint device 204, a user can operate input components of user interface 232 to invoke functionality of endpoint device 204 and/or receive output from endpoint device 204 user via output components of user interface 232. In some embodiments, endpoint device 204 may have a limited user interface (e.g., a small number of indicator lights and buttons) or no user interface.

Storage medium 233 can incorporate any type of data storage media, including but not limited to disk, flash memory, or any other non-transitory storage medium, or a combination of media, and can include volatile and/or non-volatile media. Storage medium 233 can be used to store program code to be executed by controller 230 and any other data or instructions that may be generated and/or used in the operation of endpoint device 204. For instance, program code stored by storage medium 233 can include a communication software module 238 that provides executable program code implementing a protocol for communication with grantor device 110, including a protocol for performing authentication as described herein. Other data stored by storage medium 233 can include a token pair 240 that can be used in authentication processes as described herein.

Controllable hardware 234 can include any other components that may be present in endpoint device 204 to enable its functionality. For example, in various embodiments controllable hardware 234 can include one or more storage devices using fixed or removable storage media to store data for a user; GPS receiver; a network interface; power supply and/or power management circuitry; environmental sensors (e.g., temperature sensor, pressure sensor, accelerometer, chemical sensor, etc.); actuators (e.g., motor controllers, switches, or the like); and so on. It is to be understood that any type of endpoint device functionality can be supported by providing appropriate controllable hardware 234.

Input/output (I/O) interface 236 can include hardware components and supporting software configured to allow endpoint device 204 to communicate with other devices. In some embodiments, I/O interface 236 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 236 can support a wired connection to another device (e.g., grantor device 110 of FIG. 1). In some embodiments, I/O interface 236 can enable communication between endpoint device 204 and network 104 of FIG. 1, either directly or via an intermediary device such as grantor device 110.

In some embodiments, an implementation of grantor device 110 of FIG. 1 can be generally similar to endpoint device 204. Grantor device 110 can include code modules to implement an authentication process with endpoint device 204 and authentication server 102; examples of such processes are described below.

Figure 3:
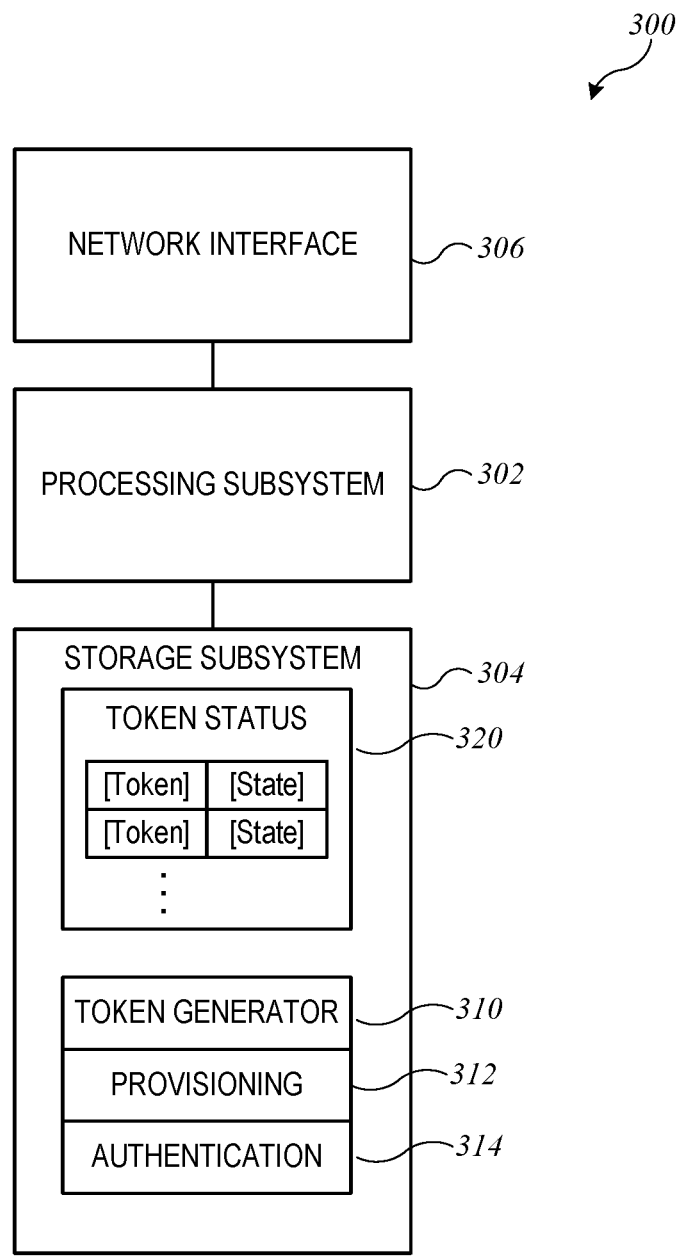
FIG. 3 is a simplified block diagram of an authentication server according to an embodiment of the present invention.

FIG. 3 is a simplified block diagram of an authentication server 300 according to an embodiment of the present invention. Authentication server 300 (e.g., implementing authentication server 102 of FIG. 1) can include processing subsystem 302, storage subsystem 304, and network interface 306. In various embodiments, authentication server 300 may include components not explicitly shown in FIG. 3, including but not limited to additional storage devices; user input and/or output components; ports for connecting to additional devices such as audio/video devices, cameras, microphones, etc.

Processing subsystem 302 can include, e.g., one or more single-core or multi-core microprocessors and/or microcontrollers executing program code to perform various functions associated with authentication server 300. For example, where authentication server 302 receives a request (e.g., via network interface 306), processing subsystem 302 can execute appropriate program code to respond to the request.

Storage subsystem 304 can incorporate any type of data storage media, including but not limited to disk, flash memory, or any other non-transitory storage medium, or a combination of media, and can include volatile and/or non-volatile media. In some embodiments, storage subsystem 304 can be implemented using distributed storage technologies such as network attached storage or the like. Storage subsystem 304 can be used to store program code to be executed by processing subsystem 302 and any other data or instructions that may be generated and/or used in the operation of authentication server 300. For instance, program code stored by storage subsystem 304 can include a token generator code module 310 that provides executable code to generate one or more new tokens; a provisioning code module 312 that provides executable program code implementing a protocol for providing new tokens to provisioning server 106; and an authentication code module 314 that provides executable program code implementing a protocol for an authentication operation to authenticate an endpoint device (e.g., endpoint device 108 or 109 of FIG. 1).

Other data stored by storage subsystem 304 can include token status table 320 (e.g., implementing token state table 132 of FIG. 1). In some embodiments, token status table 320 can store information for every token that authentication server 300 has generated. The stored information can include a token state, which can be assigned to each token by authentication server 300 from a predefined set of states. The state assigned to a particular token can be updated from time to time in response to transactions or events involving that token. Examples of specific token states and state transitions are described below.

Network interface 306 can include hardware components and supporting software configured to allow authentication server 300 to communicate with other computer systems via local area networks and/or wide area networks. Network interface 306 can be implemented using wired communication technology such as Ethernet and/or wireless communication technology such as Wi-Fi. In some embodiments, authentication server 102 is configured as an HTTP (Hypertext Transfer Protocol) server; other servers and devices can send HTTP requests to authentication server 102 and receive HTTP responses, allowing for synchronous communications. Other communication protocols can also be used.

Figure 4:
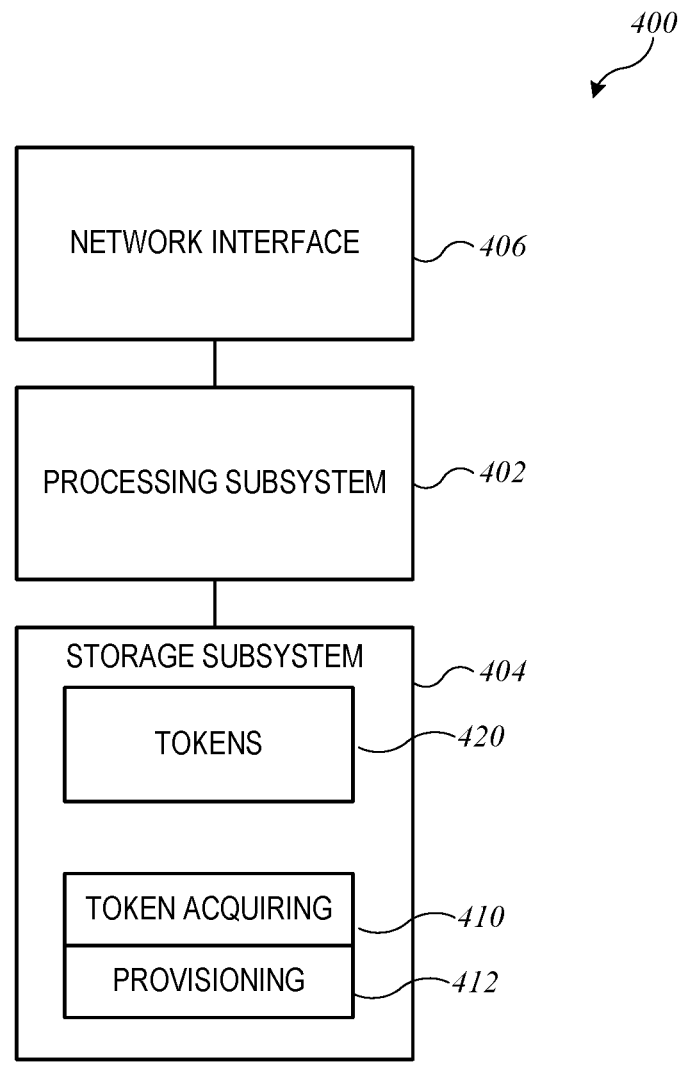
FIG. 4 is a simplified block diagram of a provisioning server according to an embodiment of the present invention.

FIG. 4 is a simplified block diagram of a provisioning server 400 according to an embodiment of the present invention. Provisioning server 400 (e.g., implementing provisioning server 106 of FIG. 1) can include processing subsystem 402, storage subsystem 404, and network interface 406. In various embodiments, provisioning server 400 may include components not explicitly shown in FIG. 4, including but not limited to additional storage devices; user input and/or output components; ports for connecting to additional devices such as audio/video devices, cameras, microphones, etc.

Processing subsystem 402 can include, e.g., one or more single-core or multi-core microprocessors and/or microcontrollers executing program code to perform various functions associated with provisioning server 400. For example, where provisioning server 402 receives a request (e.g., via network interface 406), processing subsystem 402 can execute appropriate program code to respond to the request.

Storage subsystem 404 can incorporate any type of data storage media, including but not limited to disk, flash memory, or any other non-transitory storage medium, or a combination of media, and can include volatile and/or non-volatile media. In some embodiments, storage subsystem 404 can be implemented using distributed storage technologies such as network attached storage or the like. Storage subsystem 404 can be used to store program code to be executed by processing subsystem 402 and any other data or instructions that may be generated and/or used in the operation of provisioning server 400. For instance, program code stored by storage subsystem 404 can include a token acquiring code module 410 that provides executable code implementing a protocol for obtaining one or more new tokens from authentication server 102 and a provisioning code module 412 implementing a protocol for providing a new token pair to an endpoint device (e.g., endpoint device 108 or 109 of FIG. 1) and reporting the event to authentication server 102. Other data stored by storage subsystem 404 can include tokens 420 that have been received from authentication server 102. In some embodiments, storage subsystem 404 stores a token until such time as the token is provided to an endpoint device, after which it can be discarded from storage subsystem 404.

Network interface 406 can include hardware components and supporting software configured to allow provisioning server 400 to communicate with other computer systems via local area networks and/or wide area networks. Network interface 406 can be implemented using wired communication technology such as Ethernet and/or wireless communication technology such as Wi-Fi.

It will be appreciated that the system configurations and components described herein are illustrative and that variations and modifications are possible. Endpoint devices, grantor devices, and servers may have other capabilities not specifically described herein. For instance, a grantor device may provide such capabilities as mobile telephony, navigation using the Global Positioning System (GPS), broadband data communication, Internet connectivity, etc.

Further, while devices and servers are described herein with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. In some embodiments, a server may be implemented using a server farm architecture in which multiple processing subsystems operate in a coordinated manner to respond to received requests, and the components of a server farm may be physically remote from each other and communicatively coupled using networking technologies.

Devices and systems of the kind described above can implement a dual-token authentication process using tokens that are generated by authentication server 102 of FIG. 1 and provided (directly or indirectly) to endpoint devices 108, 109. After generating a token, authentication server 102 can track the state of the token to determine whether a particular token pair presented by an endpoint device (e.g., endpoint device 108 or 109) at any given time is valid or not valid. Specific examples of processes for dual-token authentication will now be described.

Before authentication can occur, an endpoint device (e.g., endpoint device 108 or 109) needs to have a token pair (e.g., token pair 121) that is in a valid state in token state table 132. In some embodiments, endpoint device 108 (or 109) can obtain an initial token pair from provisioning server 106, e.g., during manufacture and initial provisioning of endpoint device 108 or as part of a firmware update delivered to endpoint device 108. Provisioning server 106 can obtain new tokens from authentication server 102. In embodiments described herein, it is assumed that provisioning server 106 is operated by a manufacturer of endpoint devices, which might be separate from the entity that manages authentication server 102. Further, there might be multiple instances of provisioning server 106 operated by different manufacturers of endpoint devices. Regardless of the number of provisioning servers, it may be desirable for all tokens to be generated by a single source (e.g., authentication server 102), in order to avoid duplicate tokens.

Figure 5:
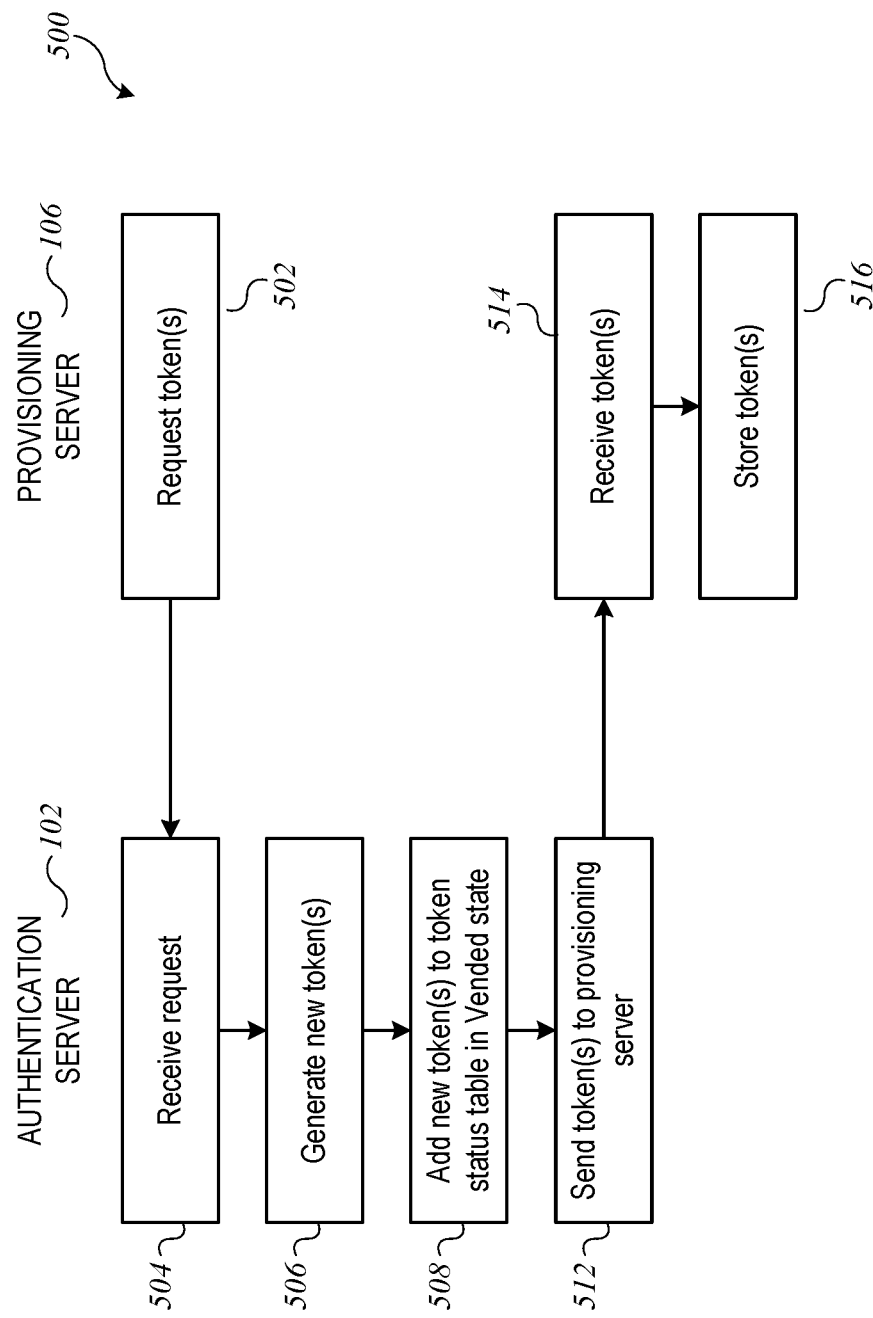
FIG. 5 shows a block diagram of a token vending process according to an embodiment of the present invention.

FIG. 5 shows a block diagram of a token vending process 500 according to an embodiment of the present invention. Token vending process 500 can be used to obtain a new valid token for initial provisioning of an endpoint device. In some embodiments, portions of process 500 can be performed by authentication server 102 of FIG. 1 while other portions of process 500 are performed by provisioning server 106. Process 500 assumes that authentication server 102 and provisioning server 106 have an established trust relationship such that authentication server 102 permits provisioning server 106 to receive authentication tokens. For example, authentication server 102 and provisioning server 106 may communicate using a virtual private network (VPN) or other secure channel; in addition or instead, provisioning server 106 may be required to authenticate, e.g., using a conventional digital certificate and digital-signature-based challenge, prior to executing process 500.

Process 500 can begin at block 502, when provisioning server 106 sends a request for one or more tokens to authentication server 102. At block 504, authentication server 102 can receive the request. In some embodiments, authentication server 102 can perform identity verification on the request. For instance, in some embodiments, provisioning server 106 may be required to digitally sign each request for tokens that it sends, and authentication server 102 can verify the digital signature.

At block 506, authentication server 102 can generate one or more new tokens in response to the request. In some embodiments, a request can specify the number of tokens to generate, and authentication server 102 can generate the specified number of tokens. Each token can be an arbitrary bit sequence of fixed length (e.g., 32 bits, 64 bits, 128 bits, or some other length). Some or all of the bits can be randomly generated. In some embodiments, the token can be a structured field that includes certain non-random bits to represent information such as when the token was generated, the identity of provisioning server 106, the identity of authentication server 102, or the like, with the remaining bits being random. Token generation may also include verifying that the token is unique, i.e., that it does not match any other token already stored in token status data store 130. The particular token-generation procedures can be varied and may use random-number generators (including pseudorandom-number generators) or any other technique for generating a value that makes it difficult or impossible to predict whether a given value would be valid. At block 508, authentication server 102 can add the new tokens to token status data store 130 with an initial state of "Vended," indicating that the token has been sent (vended) to another entity for use in a future authentication operation.

At block 512, authentication server 102 can send the new token(s) to provisioning server 106 as a response to the request.

At block 514, provisioning server 106 can receive the token(s). At block 516, provisioning server 106 can store the token(s), e.g., in vended tokens data store 140.

It will be appreciated that process 500 is illustrative and that variations and modifications are possible. Operations can be performed in a different order to the extent that logic permits; operations described above may be omitted or combined; and operations not expressly described above may be added. For instance, in some embodiments authentication server 102 can generate tokens in advance of receiving a request. Such "pre-generated" tokens can be stored in token status data store 130 with a state of "Generated" to indicate that the token exists but has not yet been vended to any other entity. Where pre-generation of tokens is implemented, block 506 can include retrieving a token that has the Generated state from token status data store 130.

Upon completion of process 500, provisioning server 106 is storing one or more tokens in vended tokens data store 140, and the tokens are in the Vended state in token status data store 130 of authentication server 102. Provisioning server 106 can now provide initial token pairs to endpoint devices.

Figure 6A:
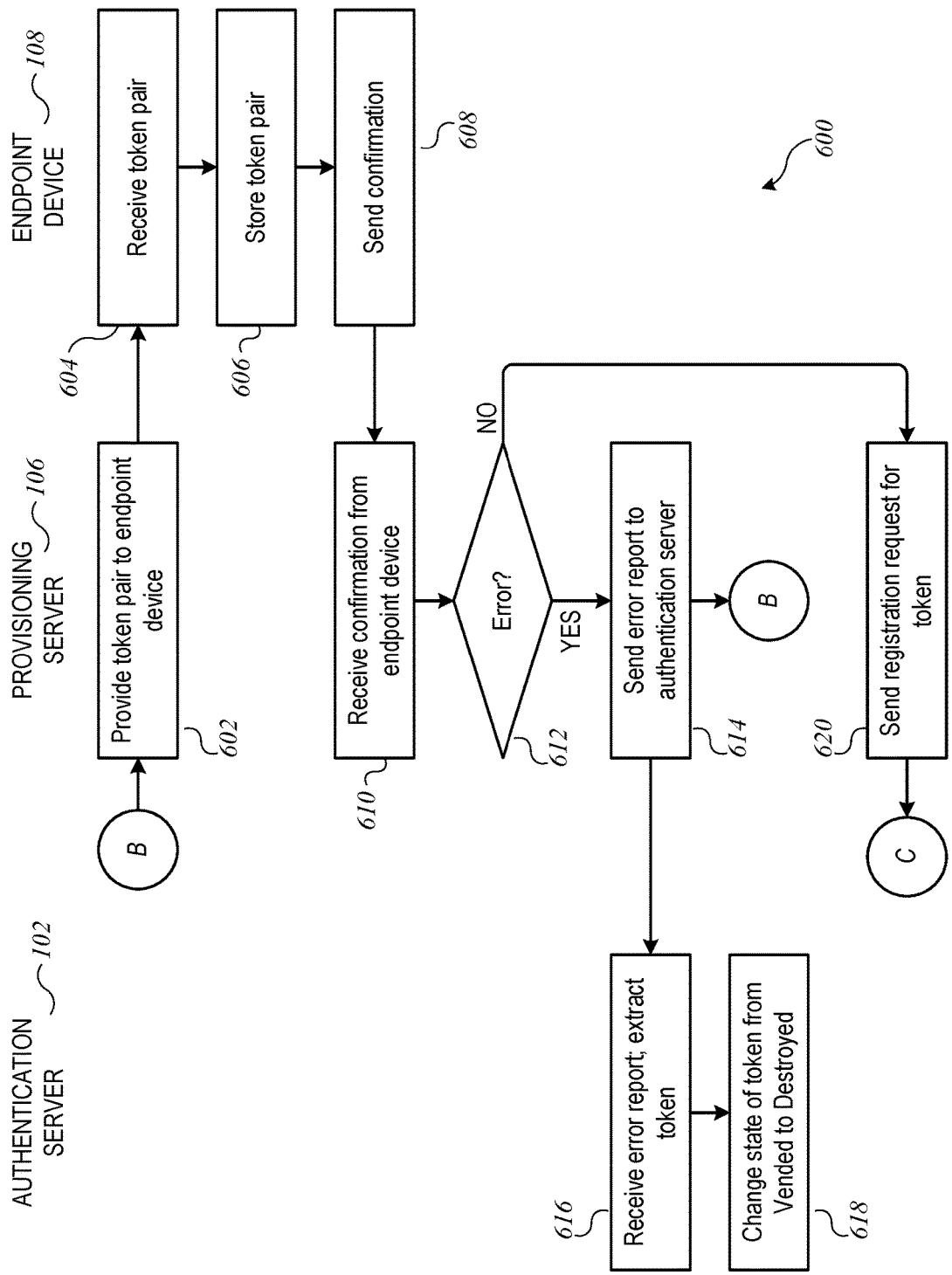
FIGS. 6A-6B are a flow diagram of a process for providing a token to an endpoint device according to an embodiment of the present invention.
Figure 6B:
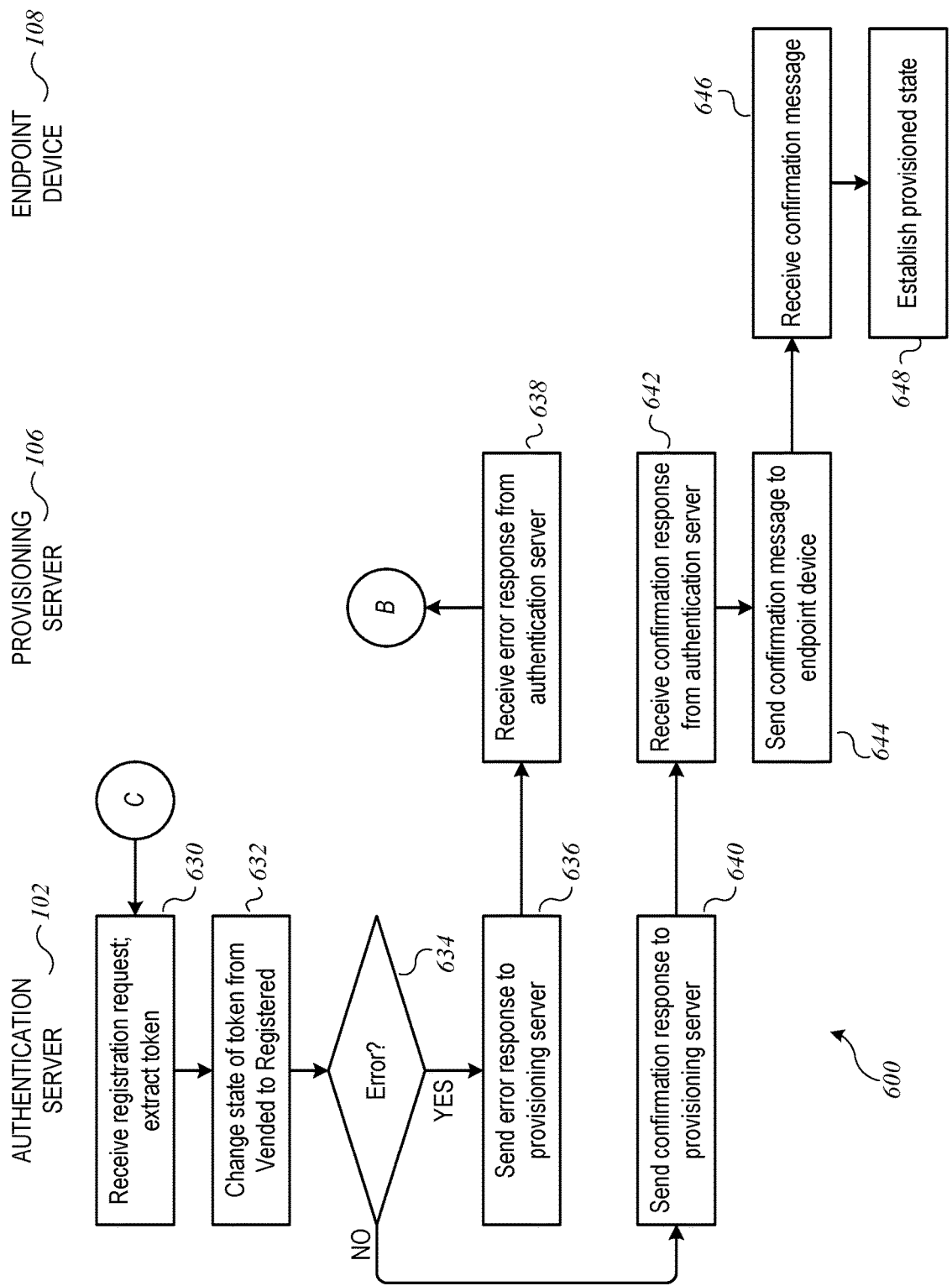

FIGS. 6A-6B are a flow diagram of a process 600 for providing a token to an endpoint device according to an embodiment of the present invention. Portions of process 600 can be performed by a provisioning server (e.g., provisioning server 106 of FIG. 1), while other portions are performed by an endpoint device (e.g., endpoint device 108 (or 109) of FIG. 1) and still other portions are performed by an authentication server (e.g., authentication server 102 of FIG. 1). It is assumed that provisioning server 106 has already performed process 500 and is in possession of one or more vended tokens that it has not yet provided to any endpoint device.

Referring first to FIG. 6A, process 600 can start at block 602, when provisioning server 106 provides an initial token pair to endpoint device 108. Depending on implementation, various conditions may trigger provisioning server 106 to provide an initial token pair to endpoint device 108. For example, endpoint device 108 may be designed to interoperate with a grantor device (e.g., grantor device 110 of FIG. 1) that requires authentication by authentication server 102 as a precondition of interaction. When endpoint device 108 is manufactured, it can be configured at the factory with an initial token pair to enable authentication. As another example, an initial token pair may be provided to endpoint device 108 as part of a firmware update, e.g., if an authentication requirement is being added to an existing ecosystem that includes endpoint device 108. In such cases, the updated firmware may include instructions for endpoint device 108 to communicate with provisioning server 106 to request and receive an initial token pair. As yet another example, endpoint device 108 may provide a user-operable control to reset endpoint device 108 to its initial factory settings. Where performing a factory reset may erase any previously-stored token pair, endpoint device 108 can be configured to request and obtain a new initial token pair from provisioning server 106 after performing a factory reset.

Providing a token pair at block 602 can include selecting a token from vended tokens data store 140 to be designated as the newer token of the initial token pair. The older token of the initial token pair can be a special "null" token. The null token can be a particular bit sequence having the same length as any other token and a value that is unique among all tokens in token status data store 130. Like any other token, the null token can be stored in token status data store 130. The null token differs from other tokens in that it is assigned a "Null" state that it can retain indefinitely, allowing the same null token to be reused across any number of endpoint devices. In authentication processes described below, the null token can serve as a placeholder for the older token of a token pair in instances where a newly-provisioned endpoint device is authenticating for the first time. In some embodiments, there can be multiple different null tokens, e.g., a different null token for each instance of provisioning server 106.

The token pair can be provided to endpoint device 108 using any available communication channel between provisioning server 106 and endpoint device 108. If block 602 is being performed while endpoint device 108 is at the factory or a repair facility, a point-to-point connection may be used. Alternatively, provisioning server 106 and endpoint device 108 can communicate via a network (e.g., network 104 of FIG. 1); any desired security protocols can be implemented.

At block 604, endpoint device 108 can receive the initial token pair, and at block 606, endpoint device 108 can store the initial token pair in non-volatile storage. Use of non-volatile storage can avoid loss of the token pair in the event that endpoint device 108 loses operating power or clears its volatile storage for any reason (e.g., restarting firmware to recover from a system error).

At block 608, endpoint device 108 can send a confirmation message to provisioning server 106. The confirmation message indicates that the token pair was received and stored. In some embodiments, the confirmation message can include data usable for error detection (e.g., the token pair or just the newer token of the pair). In some embodiments, this confirmation message may be omitted.

At block 610, provisioning server 106 can receive the confirmation message. At block 612, provisioning server 106 can determine whether an error occurred. Various error-detection logic can be used. For example, if the confirmation message from endpoint device 108 includes error-detection data, provisioning server 106 can use that data to detect errors. In some embodiments, provisioning server 106 may determine that an error occurred if no response is received from endpoint device 108 within a timeout period. If an error is detected, then at block 614, provisioning server 106 can send an error report to authentication server 102. The error report can include the token pair (or just the newer token) that resulted in the error. Provisioning server 106 can return to block 602 and provide a new token pair, which can include a different new token and the same null token, to endpoint device 108. In some embodiments, after sending the error report at block 614, provisioning server 106 can discard the new token that resulted in the error.

If an error report is sent, then at block 616, authentication server 102 can receive the error report and extract the token that resulted in the error. At block 618, authentication server 102 can update token status data store 132 to change the state of that token from Vended to Destroyed. (As described below, a token in the Destroyed state cannot be used in a successful authentication.) In some embodiments, authentication server 102 can return a response to the error report to provisioning server 106.

If, at block 612, no error occurs, then at block 620, provisioning server 106 can send a registration request for the new token to authentication server 102. Registration requests can be sent similarly to the request for token(s) at block 502 of process 500, e.g., via a secure and trusted channel. The registration request can include the new token that is now stored by endpoint device 108.

Referring now to FIG. 6B, at block 630, authentication server 102 can receive the registration request from provisioning server 106 and extract the token. At block 632, authentication server 102 can update token status data store 132 to change the state of the token from Vended to Registered. In some embodiments, an error may be detected, e.g., if the token is not found in token status data store 132 or if the token is found but is not in the Vended state.

At block 634, authentication server 102 can determine whether an error is detected. If so, then at block 636, authentication server 102 can send an error response to provisioning server 106. At block 638, provisioning server 106 can receive the error response. Provisioning server 106 can discard the token that resulted in the error and return to block 602 to provide a different initial token pair to endpoint device 108. In some embodiments, prior to providing a different initial token pair, provisioning server 106 can notify endpoint device 108 that an error occurred and that a new initial token pair will be sent.

If, at block 634, no error is detected, then at block 640, authentication server 102 can send a confirmation response to provisioning server 106. At block 642, provisioning server 106 can receive the confirmation response. At block 644, provisioning server 106 can send a confirmation response to endpoint device 108, responsive to the confirmation sent by endpoint device 108 at block 608.

At block 646, endpoint device 108 can receive the confirmation response. At block 648, endpoint device 108 can establish itself in a provisioned state, meaning that it has a token pair that is ready for use in authentication. In some embodiments, whether endpoint device 108 is in a provisioned state can be used to determine whether endpoint device 108 should continue to attempt to acquire an initial token pair from provisioning server 106.

It will be appreciated that process 600 is illustrative and that variations and modifications are possible. Operations can be performed in a different order to the extent that logic permits; operations described above may be omitted or combined; and operations not expressly described above may be added. For example, in some embodiments endpoint device 108 can be pre-loaded with the null token prior to executing process 600, and provisioning server 106 can just send the new token from vended tokens data store 140.

Process 600 can be repeated with any number of different endpoint devices; for instance, endpoint device 109 can be provisioned using a separate instance of process 600. Different instances of process 600 can execute consecutively or concurrently. In some embodiments, provisioning server 106 need not send a separate registration request (or error report) to authentication server 102 for each instance of process 600. For example, instead of sending a separate registration request or error report for each instance of process 600, some embodiments of provisioning server 106 can generate a bulk-update request at regular intervals (e.g., hourly, daily, or weekly). The bulk-update request can include a list of all the vended tokens that were provided without an error at block 612 and a list of all the vended tokens for which error was detected at block 612. Authentication server 102 can receive the bulk-update request and update token status data store 132 accordingly. Bulk updates may be more efficient, e.g., where endpoint devices 108 are being provisioned in large quantities, such as in a factory production line.

Once an endpoint device has been provisioned with an initial token pair, the endpoint device can use its stored token pair in authentication processes with authentication server 102. In one example use-case, it is assumed that an endpoint device (e.g., endpoint device 109 of FIG. 1) is attempting to interoperate with a grantor device (e.g., grantor device 110). Grantor device 110 can rely entirely or in part on authentication server 102 to determine whether to allow the interoperation. For instance, grantor device 110 can obtain the stored token pair (e.g., token pair 122) from endpoint device 109 and forward the token pair to authentication server 102, which can use the token pair in a logic process to determine whether to authenticate endpoint device 109.

Figure 7A:
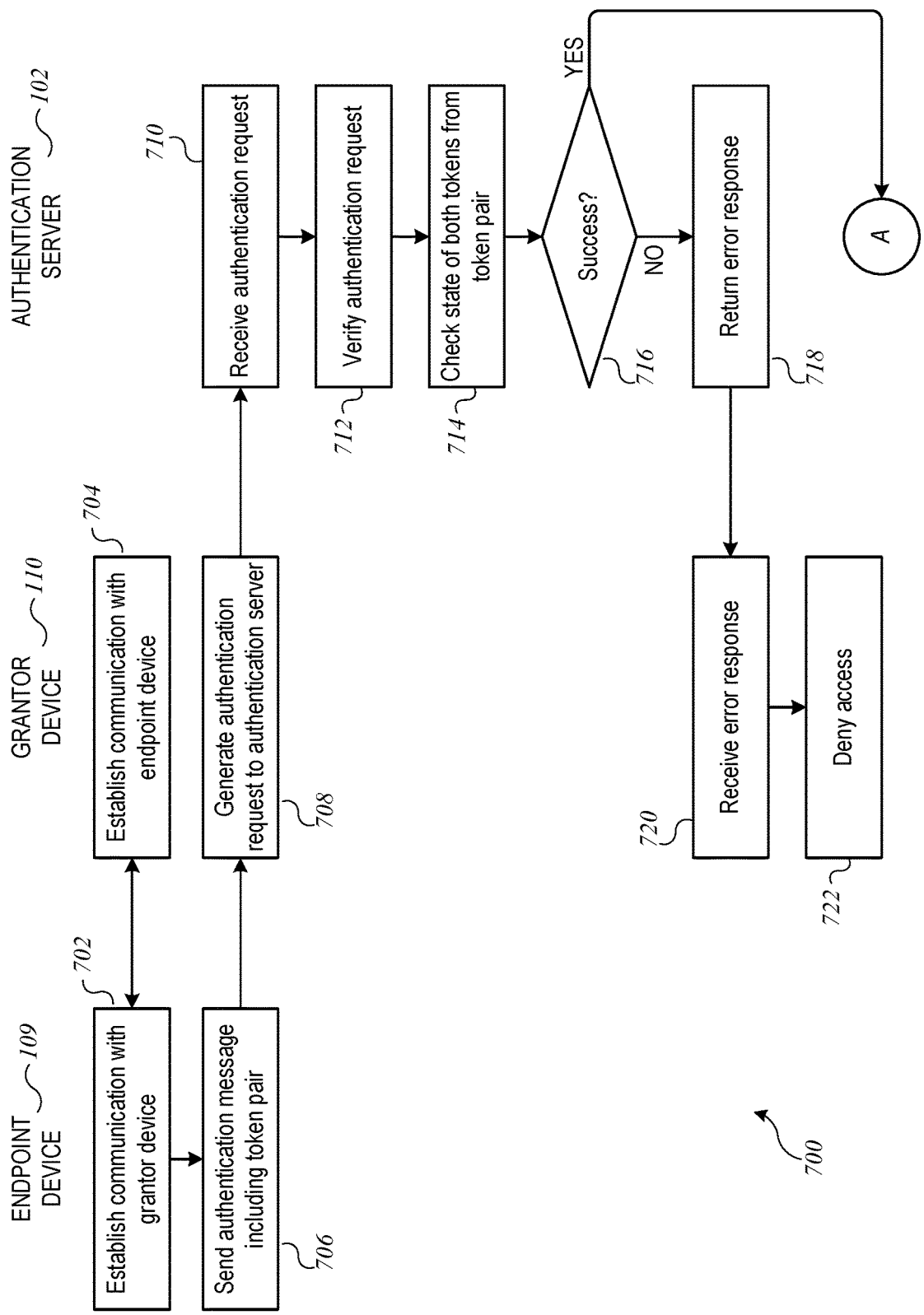
FIGS. 7A-7B are a flow diagram of a process for authenticating an endpoint device according to an embodiment of the present invention.
Figure 7B:
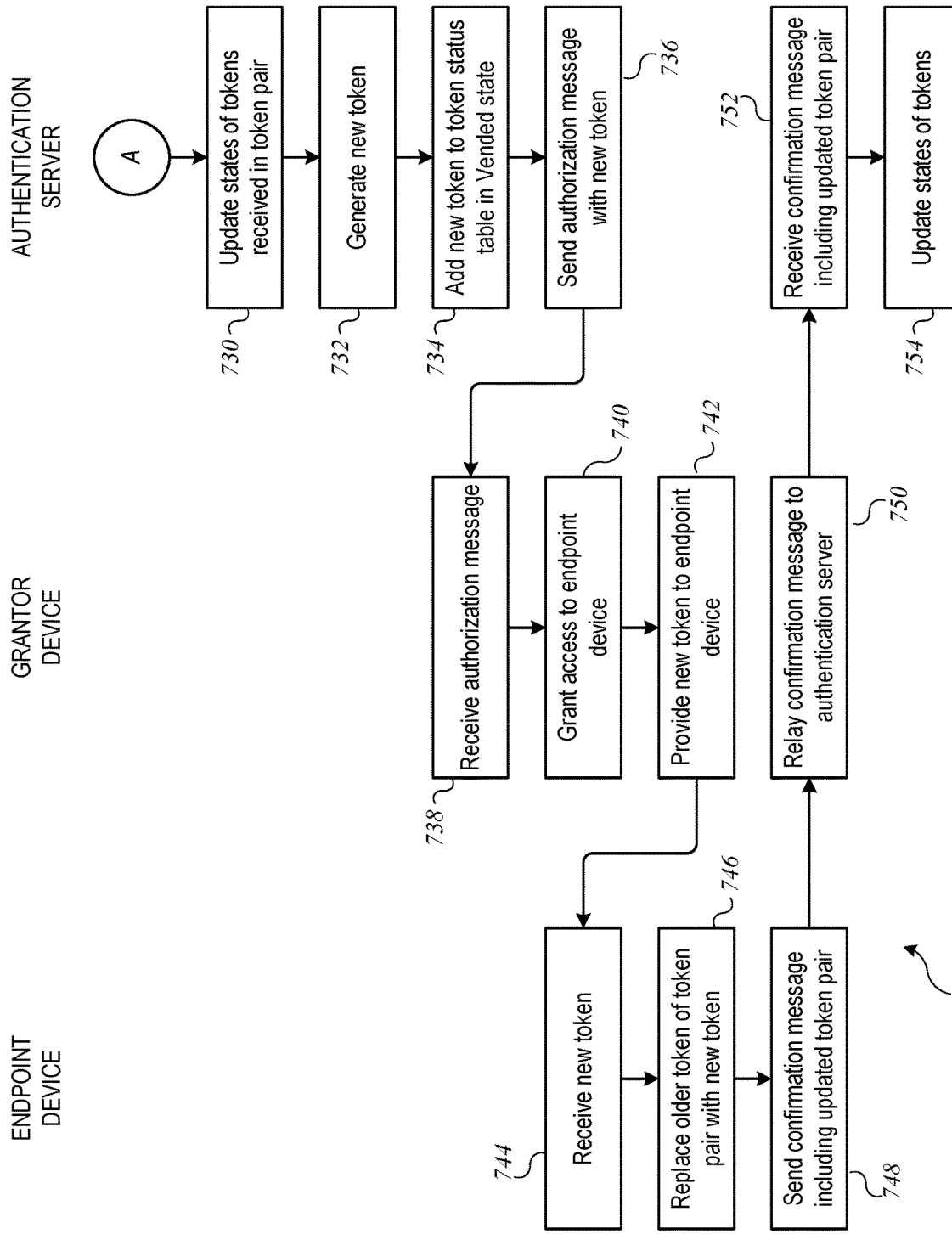

FIGS. 7A-7B are a flow diagram of a process 700 for authenticating an endpoint device according to an embodiment of the present invention. Portions of process 700 can be performed by an authentication server (e.g., authentication server 102 of FIG. 1), while other portions are performed by a grantor device (e.g., grantor device 110 of FIG. 1) and still other portions are performed by an endpoint device (e.g., endpoint device 109 of FIG. 1). It is assumed that endpoint device 109 has a stored token pair (e.g., token pair 122), which may have been obtained using process 600 or a previous instance of process 700 (as will become apparent). The token pair includes a newer token $T_n$ and an older token $T_{n-1}$.

Referring first to FIG. 7A, process 700 can start at blocks 702, 704, when endpoint device 109 and grantor device 110 establish communication with each other. Various communication protocols can be used, and depending on implementation, the communication channel at this stage might or might not be secure. Establishing communication can include exchanging identifying information about the two devices and information about a desired interoperation. In the course of establishing communication, it is assumed that grantor device 110 and endpoint device 109 determine that authentication of endpoint device 109 using authentication server 102 is desired.

Accordingly, at block 706, endpoint device 109 can send an authentication message to grantor device 110. The authentication message can include stored token pair 122. In some embodiments, grantor device 110 can request the token pair from endpoint device 109; in other embodiments, endpoint device 109 may provide the token pair without receiving an explicit request from grantor device 110.

At block 708, grantor device 110 can generate an authentication request for endpoint device 109 and send the request to authentication server 102. The authentication request can include the token pair received from endpoint device 109. Other information can also be included, e.g., any device-identifying information that grantor device 110 has obtained from endpoint device 109 and/or identifying information for grantor device 110. In some embodiments, grantor device 110 can digitally sign the authentication request using a digital certificate that can be verified by authentication server 102.

At block 710, authentication server 102 can receive the authentication request. At block 712, authentication server 102 can verify the authentication request. For instance, if grantor device 110 digitally signed the authentication request, authentication server 102 can validate the signature. If the authentication request includes identifying information for endpoint device 109 and/or grantor device 110, authentication server 102 can consult a database of approved devices to determine that the request is appropriate.

Assuming the request is successfully verified, at block 714, authentication server 102 can extract both tokens ($T_n$ and $T_{n-1}$) from the received token pair and check the state of both tokens in token status data store 132. In some embodiments, the combined state of the two tokens (referred to as a "pair state") is required to correspond to a valid pair state in order for the authentication to succeed. A specific example is described below with reference to FIGS. 9 and 10.

At block 716, authentication server 102 can determine whether the authentication request succeeds. In some embodiments, the authentication request succeeds if block 714 results in determining that the two tokens are in a valid pair state (and if the verification operation performed at block 712 succeeded); otherwise, the authentication request fails.

If, at block 716, the authentication request fails, then at block 718, authentication server 102 can return an error response to grantor device 110. In some embodiments, the error response can include an indication of the specific error that occurred. At block 720, grantor device 110 can receive the error response, and at block 722, grantor device 110 can deny access by endpoint device 109 to any functionality of grantor device 110 that is protected by authentication. In some embodiments, this may include all functionality of grantor device 110, so that endpoint device 109 and grantor device 110 do not interoperate at all if authentication fails; in other embodiments, only a subset of functionality of grantor device 110 may be protected by authentication, and endpoint device 109 may be selectively permitted to access only unprotected functionality. In some embodiments, when an error occurs, grantor device 110 may retry the authentication rather than denying access, and the determination whether to retry the authentication or deny access can be based on the particular error indicated in the error response received at block 720.

Referring now to FIG. 7B, if authentication succeeds, then at block 730, authentication server 102 can update the respective states of the tokens $T_n$ and $T_{n-1}$ in token status data store 132. The new states can be determined based on the states that were read from token status data store 132 (at block 714) by applying update logic that advances tokens along the normal state sequence in response to successful authentication. A specific example is described below with reference to FIG. 11. At block 732, authentication server 102 can generate a new token ($T_{n+1}$). Generation of the new token can be similar or identical to token generation at block 506 of process 500 described above. At block 734, authentication server 102 can add the new token $T_{n+1}$ to token status data store 132 with its state set to an initial state of the normal state sequence (e.g., the Vended state referenced above in connection with process 500). At block 736, authentication server 102 can send an authorization message to grantor device 110. The authorization message can include an indication that the authentication was successful. The authorization message can also include the new token $T_{n+1}$ or a new token pair that includes the tokens $T_{n+1}$ and $T_n$. In some embodiments, the authorization message can be digitally signed by authentication server 102.

At block 738, grantor device 110 can receive the authorization message from authentication server 102. If the authorization message is digitally signed, grantor device 110 can verify the digital signature. At block 740, grantor device 110 can grant access by endpoint device 109 to any functionality of grantor device 110 that is protected by authentication. (As noted above, protected functionality may include some or all of the functionality of grantor device 110.) At block 742, grantor device 110 can provide the new token $T_{n+1}$ (or the new token pair) that was received in the authorization message to endpoint device 109.

At block 744, endpoint device 109 can receive the new token $T_{n+1}$. At block 746, endpoint device 109 can store the new token $T_{n+1}$ (or the new token pair ($T_{n+1}$, $T_n$)) in non-volatile storage. In some embodiments, the new token $T_{n+1}$ can overwrite the older of the two currently stored tokens ($T_{n-1}$), which can be discarded. In other embodiments, endpoint device 109 can replace its stored token pair with the new token pair, and endpoint device 109 need not keep track of which token is older.

At block 748, endpoint device 109 can send a confirmation message to grantor device 110. The confirmation message indicates that the new token $T_{n+1}$ was received and stored. In some embodiments, the confirmation message can include the currently stored token pair ($T_{n+1}$ and $T_n$). In some embodiments, if an error occurs during storing of the new token, no message is sent at block 748, and subsequent blocks of process 700 do not occur.

At block 750, grantor device 110 can relay the confirmation message to authentication server 102.

At block 752, authentication server 102 can receive the confirmation message from grantor device 110. At block 754, authentication server 102 can update the states of the tokens $T_{n+1}$ and $T_n$ by advancing the states along the normal state sequence. This enables $T_{n+1}$ and $T_n$ to be used as the token pair in the next authentication attempt by endpoint device 109. As described below, updating token states in response to a confirmation message can facilitate recovery from various communication errors.

It will be appreciated that process 700 is illustrative and that variations and modifications are possible. Operations can be performed in a different order to the extent that logic permits; operations described above may be omitted or combined; and operations not expressly described above may be added.

After completion of their portions of process 700, assuming the authentication was successful, endpoint device 109 and grantor device 110 can interoperate. In some embodiments, interoperation of endpoint device 109 and grantor device 110 can include establishing a direct trust mechanism (e.g., establishing a shared secret between them) so that authentication server 102 does not need to participate in authentication every time endpoint device 109 and grantor device 110 reconnect. Instead, authentication server 102 may participate in authentication only when an event occurs that destroys or compromises the shared secret. Such events may include, e.g., factory reset or other user intervention that results in erasing the shared secret from endpoint device 109 and/or grantor device 110.

As noted above, process 700 relies on the states of the tokens in a token pair presented by the endpoint device and results in updating the token pair by replacing the older of the two tokens with a new token. In general, the state of a given token at authentication server 102 reflects previous events at authentication server 102 involving that token (e.g., providing the token to an endpoint device, confirming that the token has been received, using the token in authentication, and so on). Based on the states of both tokens, an authentication server can evaluate the trustworthiness of the token pair at block 714.

To illustrate the use of token states in evaluating trustworthiness, a specific example will now be described. FIG. 8A shows a table 800 listing a set of possible token states that can be defined according to an embodiment of the present invention. Each state is associated with an event; when the event occurs, the token can transition from one state to another. FIG. 8B shows a state diagram indicating transitions that may occur among the states listed in FIG. 8A. States are defined such that there is a normal state sequence (indicated by solid arrows in FIG. 8B), and in the absence of error, a token advances through this normal state sequence as events occur.

More specifically, in this example, any new token is initially generated in the Vended state (node 850 in FIG. 8B). As described above, authentication server 102 can send a newly generated token to provisioning server 106 (e.g., at block 512 of process 500) or to an endpoint device via a granting device 110 (e.g., at block 736 of process 700). In this example, either event results in a token in Vended state 850.

In the processes described above, authentication server 102 can receive a confirmation that an endpoint device has received and stored a new token (e.g., at block 630 of process 600 or at block 752 of process 700). In response to confirmation of receipt, authentication server 102 can change (advance) the state of the new token from Vended state 850 to Registered state 852.

In the normal sequence, authentication server 102 may receive an authentication request that includes one token (e.g., token $T_n$) that is in Registered state 852. In response to determining that the authentication request is valid, authentication server 102 can change the state of token $T_n$ from Registered state 852 to Exhausting state 854 (e.g., at block 730 of process 700). Exhausting state 854 indicates that the token was used in a successful authentication but receipt of a subsequent token has not yet been confirmed. A token $T_n$ can remain in Exhausting state 854 until a confirmation is received that the endpoint device stored the next token (e.g., at block 752 of process 700). At that point, authentication server 102 can change the state of token $T_n$ from Exhausting state 854 to Exhausted state 856. Once a token reaches Exhausted state 856, it can remain in that state indefinitely.

This normal sequence of states, together with the inclusion of a newer token and an older token in each token pair allows recovery from certain errors that may occur, such as missed confirmations from the endpoint device that a new token (or token pair) has been stored or missed receipt of a new token (or new token pair) by the endpoint device following successful authentication. For instance, if a Vended token is stored in an endpoint device but authentication server 102 fails to receive a confirmation, the token remains in Vended state 850. Accordingly, in some embodiments of the present invention, if one of the tokens received in an authentication request is in Vended state 850, authentication server 102 can deem the token pair valid, depending on the state of the other token in the pair. This may result in a state transition from Vended state 850 to Exhausting state 854, as indicated by the dotted line. As another example, if, after a successful authentication, authentication server 102 does not receive confirmation that the endpoint device stored a new token, the previous token will remain in Exhausting state 854. Accordingly, in some embodiments of the present invention, if one of the tokens received in an authentication request is in Exhausting state 854, authentication server 102 can deem the token pair valid, depending on the state of the other token in the pair.

Revoked state 858 and Destroyed state 860 are not part of the normal state sequence, and transitions to these states are indicated by dashed lines. In some embodiments, these states can be used to indicate errors. For instance, if provisioning server 106 reports an error to authentication server 102 during process 600, any Vended tokens involved in the error (other than the null token) can transition from Vended state 850 to Destroyed state 860. As another example, the entity that manages authentication server 102 may determine that certain tokens should not be trusted, e.g., because they were sent to a provisioning server 106 or endpoint device 109 that has been compromised (so that tokens could be obtained by unauthorized parties) or because evidence of fraud involving one or more specific tokens has been detected. When this occurs, the state of any affected tokens (regardless of their current state) can be changed to Revoked state 858, preventing future use in successful authentication processes.

FIG. 8B does not show state transitions for the Null state listed in FIG. 8A. In this example, the Null state is assigned exclusively to the null token, which is used during initial provisioning and authentication and may be shared across any number of endpoint devices. In some embodiments, the null token is included in token state data store 132, and the Null state can be assigned to this token so that it is readily identified as the null token. Multiple different null tokens, each having the Null state, can exist concurrently. For instance, as noted above, if there are multiple provisioning servers, different provisioning servers may have a different null token assigned.

It will be appreciated that the states shown in FIGS. 8A and 8B are illustrative and that variations and modifications are possible. Other states can be defined in addition to those shown in the example. For instance, as noted above, some embodiments of authentication server 102 may pre-generate tokens in advance of requests for new tokens; such tokens can be stored in a "Generated" state and transitioned to the Vended state upon being sent to an endpoint device or provisioning server. It is also possible to operate with fewer states than shown in this example, although possibilities for error detection and/or error recovery may be reduced.

Figure 9:
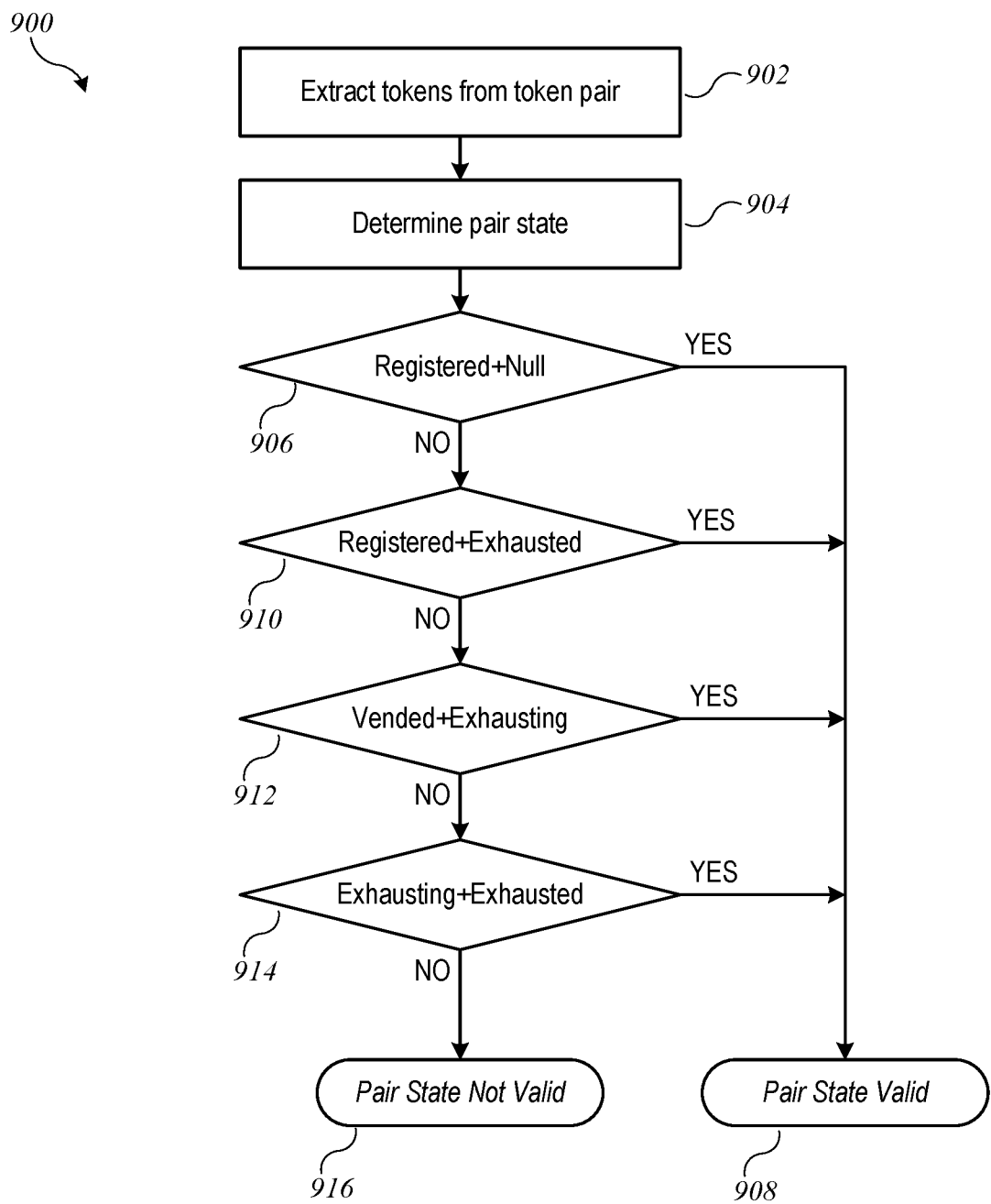
FIG. 9 is a flow diagram of a process for checking token state during an authentication operation according to an embodiment of the present invention.

The states and state transitions shown in FIGS. 8A and 8B can be used in an implementation of process 700. For example, checking token state at block 714 and updating of token states at blocks 730 and 754 can be based on the states and state transitions shown in FIGS. 8A and 8B. FIG. 9 is a flow diagram of a process 900 for checking token state according to an embodiment of the present invention. Process 900 can be implemented in authentication server 102, e.g., at block 714 of process 700.

Process 900 can begin when authentication server 102 receives a token pair as part of an authentication request. At block 902, authentication server 102 can extract individual tokens ($T_n$ and $T_{n-1}$) from the received token pair. In some embodiments, the token pair can be a structured data object, and extracting the tokens can include reading a field corresponding to $T_n$ and a field corresponding to $T_{n-1}$. In other embodiments, the endpoint device may provide tokens in an arbitrary order, and authentication server 102 need not be told which token is older.

At block 904, authentication server 102 can look up the state for each of tokens $T_n$ and $T_{n-1}$ in token status data store 132. Each token's state can be looked up independently, and the two states can be joined into a pair state. Pair states are denoted herein as S1+S2, where S1 and S2 are the states of the two tokens; it is to be understood that S2+S1 and S1+S2 denote the same pair state.

Process 900 then determines whether pair state S1+S2 corresponds to a valid pair state. For instance, a pair state of Registered+Null is the expected state the first time an endpoint device authenticates after being provisioned by provisioning server 106. Accordingly, at block 906, a pair state of Registered+Null results in a decision that the token pair is valid at block 908.

According to the normal state sequence of FIG. 8B, a pair state of Registered+Exhausted is the expected state for authentications after the first. Accordingly, at block 910, a pair state of Registered+Exhausted results in a decision that the token pair is valid at block 908.

To support recovery from missed communication, other pair states can also be recognized as valid. For example, after a prior successful authentication, a new token is provided to the endpoint device. At the time the new token is provided, its state is Vended, and the state of the immediately preceding token is Exhausting. If the endpoint receives the new token but fails to confirm receipt, at the next authentication, the endpoint device would present a token pair with pair state Vended+Exhausting. To allow recovery from the missed confirmation, at block 912, a pair state of Vended+Exhausting can result in a decision that the token pair is valid at block 908.

Similarly, after a prior successful authentication, the endpoint device might not receive the new token and may therefore still be storing the same token pair that was used in the prior successful authentication. In this case, the token pair sent by the endpoint device at the next authentication would be one that had already been used, which has a pair state of Exhausting+Exhausted. To allow recovery from a missed new token, at block 914, a pair state of Exhausting+Exhausted can result in a decision that the token pair is valid at block 908.

In process 900, any pair state other than these four results in a decision that the token pair is not valid at block 916. In the context of process 700, if authentication server 102 reports to grantor device 110 that the token pair is not valid, grantor device 110 may determine not to retry the authentication and may notify endpoint device 109 (or a user) that endpoint device 109 requires reprovisioning with a new initial token pair. In some embodiments, endpoint device 109 can communicate with provisioning server 106 to obtain a new initial token pair.

It will be appreciated that process 900 is illustrative and that variations and modifications are possible. Operations can be performed in a different order to the extent that logic permits; operations described above may be omitted or combined; and operations not expressly described above may be added. The particular set of pair states defined as valid can be modified depending on the set of token states and expected (normal-sequence) transitions.

Process 900 relies on token states being updated after determining whether the token pair is valid (e.g., at block 730 of process 700) and updated again when the endpoint device confirms receipt of a new token pair (e.g., at block 754) of process 700. Authentication server 102 can implement appropriate update logic based on the normal state sequence. By way of example, FIG. 10 shows a table 1000 of token state updates that can occur in response to a successful authentication request (e.g., at block 730 of process 700) according to an embodiment of the present invention. Left-hand columns 1002, 1004 indicate the states of the received tokens $T_n$ and $T_{n-1}$, and right-hand columns 1006, 1008 indicate the states after the update. State updates are shown only for the valid pair states defined in process 900. In some embodiments, if the pair state is not valid, authentication server 102 can change the state of both tokens in the pair to Revoked (unless one of them is the null token, which can remain in the Null state). Alternatively, when a pair state is not valid, the token states can be left unchanged (since that combination will continue to be invalid).

FIG. 11 shows a similar table 1100 of state updates that can occur in response to an endpoint device confirming receipt of a new token after successful authentication (e.g., at block 754 of process 700) according to an embodiment of the present invention. Left-hand columns 1102, 1104 indicate the states of the tokens $T_{n+1}$ and $T_n$ when the confirmation is received at authentication server 102, and right-hand columns 1106, 1108 indicate the states after the update. The first row, where the token states Vended and Exhausting are changed to Registered and Exhausted, respectively, is the normal (error-free) case. In the second row, the token states Registered and Exhausted remain unchanged; this allows for a redundant confirmation. In some embodiments, if the tokens are in any other state when the confirmation is received, authentication server 102 can change the state of both tokens to Revoked (unless one of them is the null token, which can remain in the Null state). Alternatively, if the tokens are in any pair state not shown in FIG. 11, the token states can be left unchanged.

Figure 12:
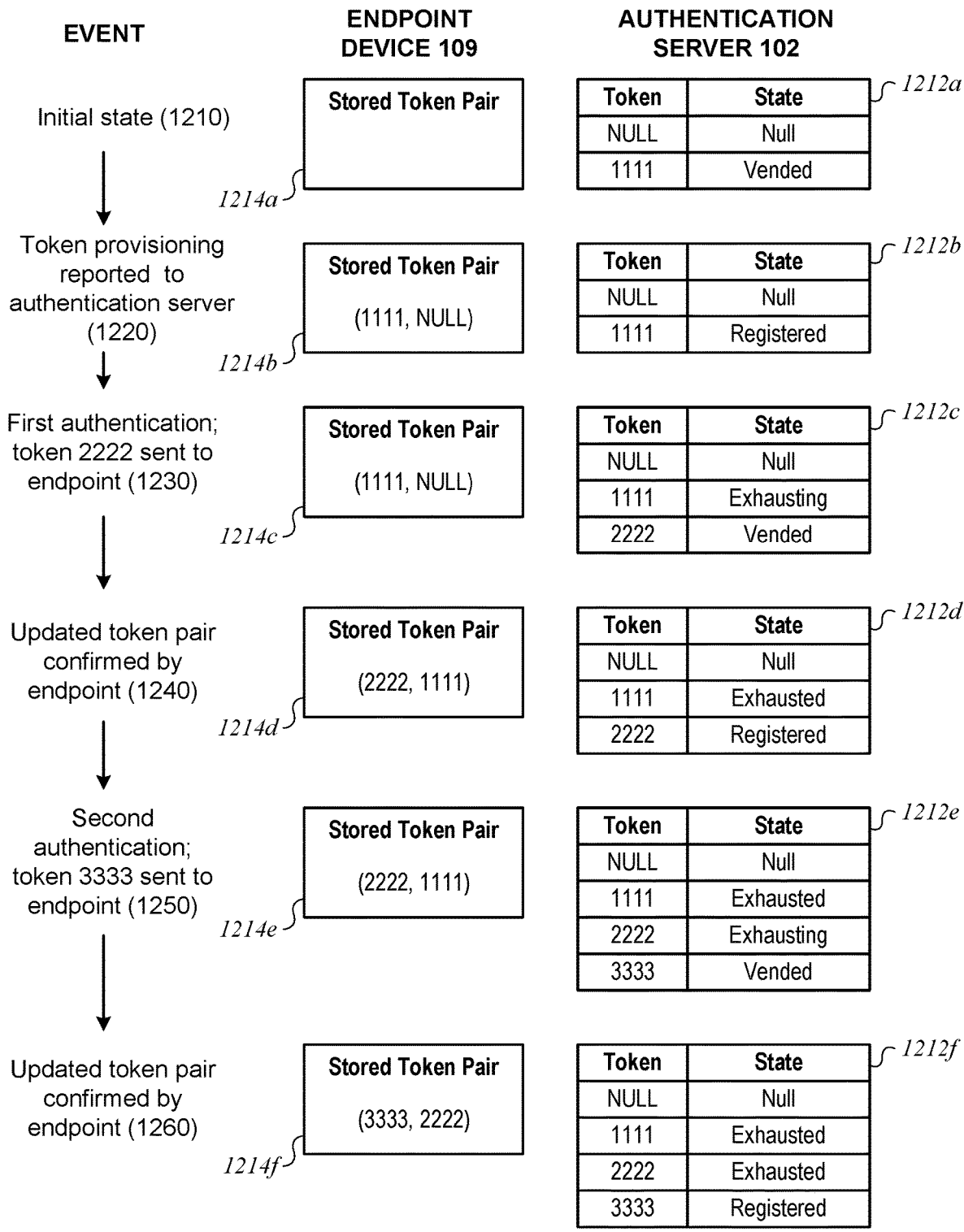
FIG. 12 shows a first example event sequence for an authentication server and an endpoint device according to an embodiment of the present invention.

To further illustrate authentication behavior, example event sequences will now be described. FIG. 12 shows a first example event sequence for authentication server 102 and endpoint device 109 according to an embodiment of the present invention. For each event (left side of FIG. 12), the stored token pair 1214 at endpoint device 109 (middle of FIG. 12) and the token state lookup table 1212 at authentication server 102 (right side of FIG. 12) are shown. It is to be understood that the same stored token pair and token state table are shown at different times.

In an event 1210, authentication server 102 has provided one or more tokens, including token 1111, to provisioning server 106, e.g., using process 500 of FIG. 5, and token 1111 has been added to token state table 1212a in the Vended state. A null token is also present in the Null state. Endpoint device 109 has not yet received any tokens, and stored token pair 1214a is empty.

Next, at event 1220, provisioning server 106 has confirmed to authentication server 102 that it provided an initial token pair 1214b (1111, NULL) to endpoint device 109, e.g., using process 600 of FIGS. 6A-6B. In response, authentication server 102 updates the state of token 1111 to Registered in token state table 1212b.

At event 1230, endpoint device 109 authenticates using stored token pair (1111, NULL). Authentication server 102 determines that the tokens have a valid pair state of Registered+Null (per table 1212b) and updates its token state lookup table as shown at 1212c. Authentication server 102 generates a new token 2222 in the Vended state and sends it to endpoint device 109.

At event 1240, endpoint device 109 updates its stored token pair 1214d to (2222, 1111) and sends a confirmation to authentication server 102. On receipt of the confirmation, authentication server 102 updates token state table 1212d such that token 1111 is in the Exhausted state and token 2222 is in the Registered state.

At event 1250, endpoint device 109 authenticates a second time, using stored token pair (2222, 1111). Authentication server 102 determines that the tokens have a valid pair state of Registered+Exhausted (per table 1212d) and updates its token state lookup table as shown at 1212e. Authentication server 102 generates a new token 3333 in the Vended state and sends it to endpoint device 109.

At event 1260, endpoint device 109 updates its stored token pair 1214f to (3333, 2222) and sends a confirmation to authentication server 102. On receipt of the confirmation, authentication server 102 updates token state table 1212f such that token 2222 is in the Exhausted state and token 3333 is in the Registered state. Endpoint device 109 and authentication server 102 can continue in this manner indefinitely, authenticating and updating tokens, as long as tokens continue to advance through the normal state sequence.

Figure 13:
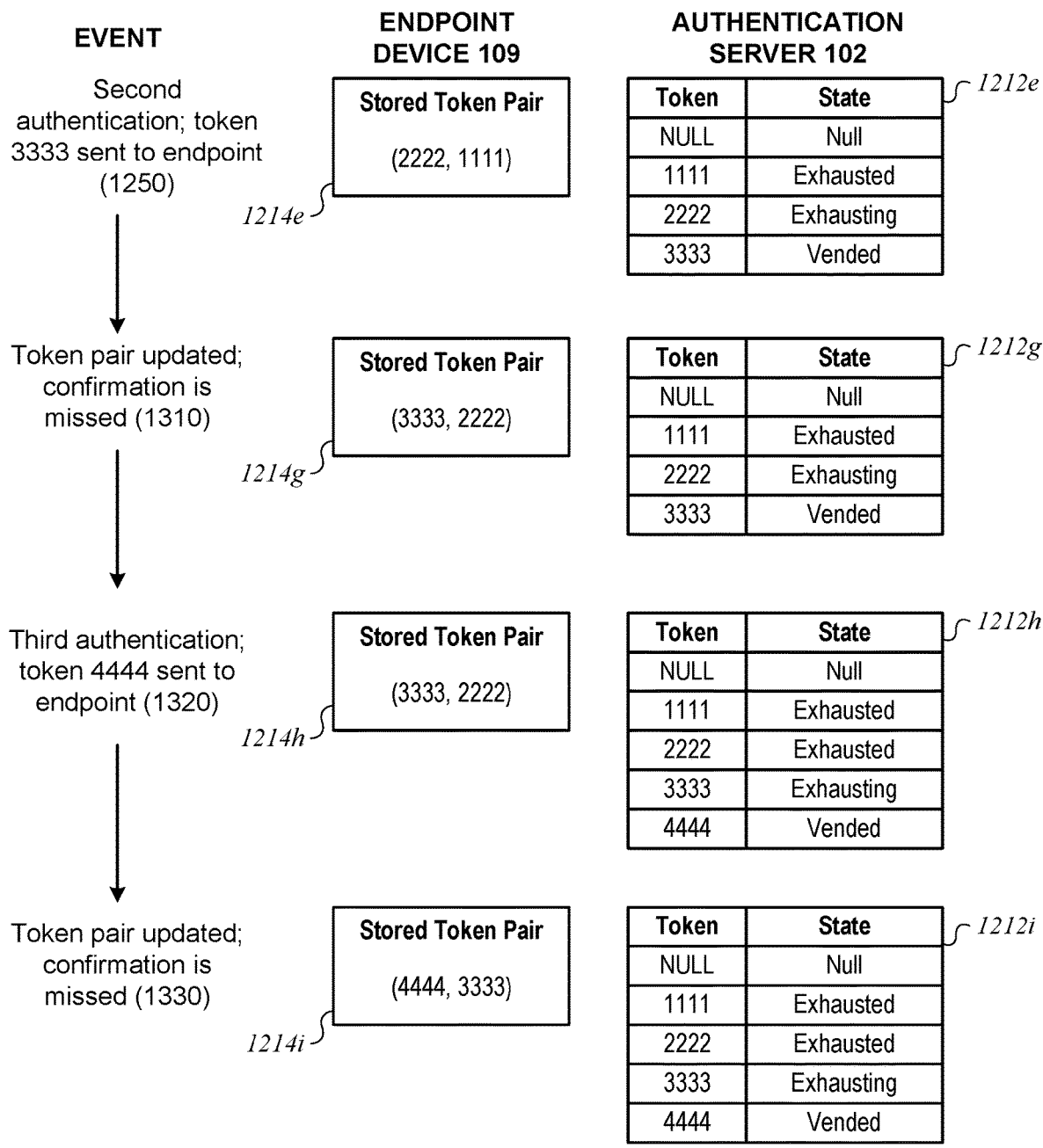
FIG. 13 shows another sequence for an authentication server and an endpoint device according to an embodiment of the present invention.

However, as noted above, communications may be missed. This may alter the sequence of events. FIG. 13 illustrates an alternative sequence of events in which endpoint device 109 receives new tokens but authentication server 102 does not receive confirmation.

The starting point for this example is event 1250 as described above, where endpoint device 109 authenticates for a second time using stored token pair 1214e (2222, 1111). In this example, at event 1310, endpoint device 109 updates its stored token pair 1214g to (3333, 2222) but authentication server 102 does not receive the confirmation. Accordingly, token state lookup table 1212g has the same tokens and states as token state table 1212e.

At event 1320, endpoint device 109 authenticates a third time, using stored token pair 1214h (3333, 2222). Authentication server 102 determines that the tokens have a valid pair state of Vended+Exhausting (per table 1212g) and updates its token status lookup table as shown at 1212h. Authentication server 102 generates a new token 4444 in the Vended state and sends it to endpoint device 109.

At event 1330, endpoint device 109 updates its stored token pair 1214i to (4444, 3333) but once again authentication server 102 does not receive the confirmation. Accordingly, token state lookup table 1214i has the same tokens and states as token state table 1212h. Although not shown in FIG. 13, endpoint device 109 will be able to authenticate using stored token pair (4444, 3333), similarly to event 1320. Thus, missed confirmation is a recoverable error condition.

Figure 14:
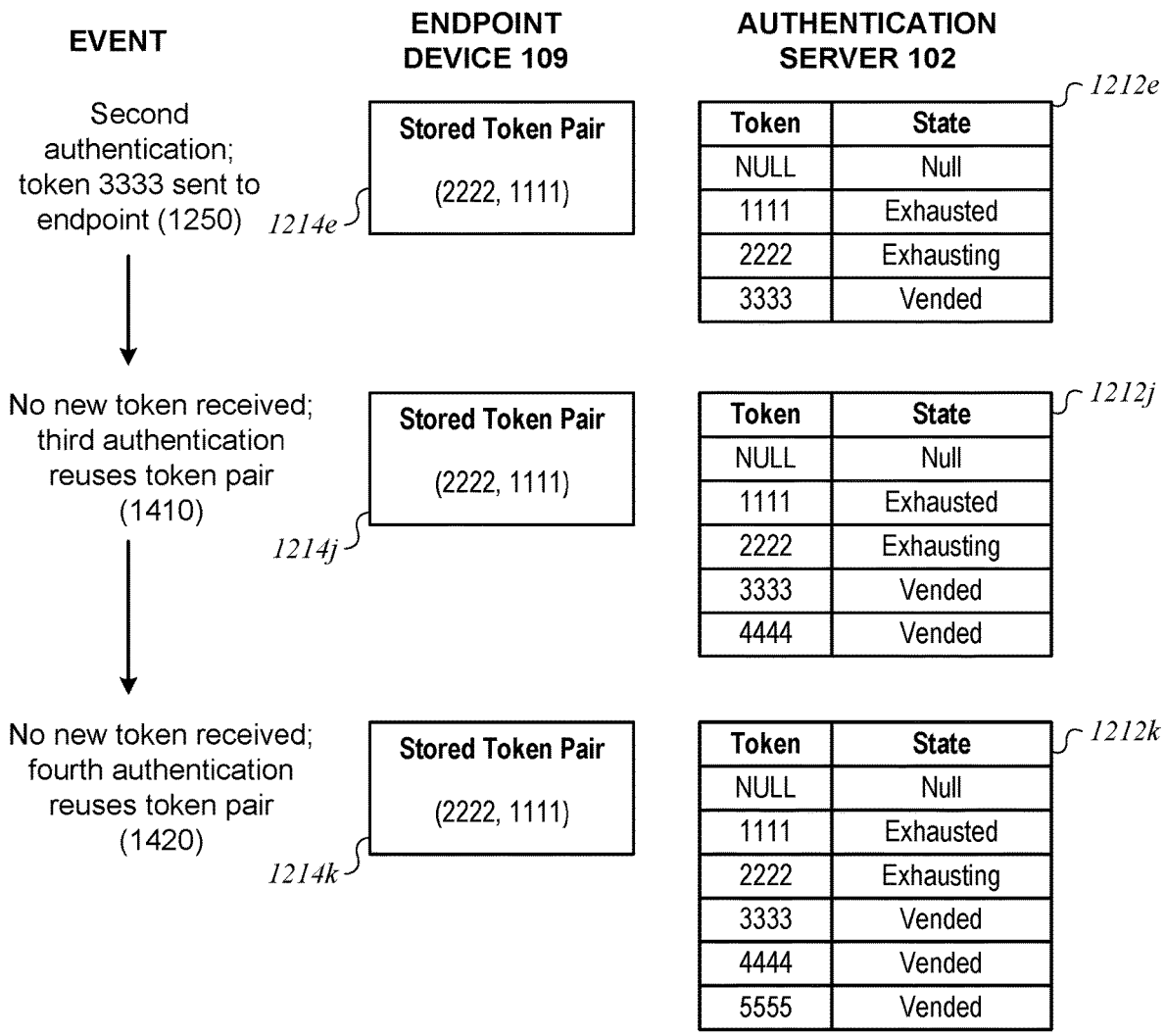
FIG. 14 shows another sequence for an authentication server and an endpoint device according to an embodiment of the present invention.

A different type of missed communication can occur when endpoint device 109 does not receive a new token in response to a successful authentication. FIG. 14 illustrates an alternative sequence of events in which endpoint device 109 does not receive the new token.

The starting point for this example is event 1250 as described above, where endpoint device 109 authenticates for a second time, using stored token pair 1214e (2222, 1111). In this example, authentication server generates a new token 3333 in the Vended state and sends the new token to endpoint device 109, but endpoint device 109 fails to receive or store the new token. Accordingly, tokens 1111, 2222, and 3333 in token state table 1212j have the same states as in token state table 1212e.

At event 1410, endpoint device 109 authenticates a third time, reusing stored token pair 1214j (2222, 1111). Authentication server 102 determines that the tokens have a valid pair state of Exhausting+Exhausted (per table 1212e) and retains that token state as shown at 1212j. Authentication server 102 generates a new token 4444 in the Vended state and sends it to endpoint device 109.

If endpoint device 109 receives and confirms the new token, the next authentication would proceed according to a normal event sequence. If endpoint device 109 receives the new token but does not confirm, the next authentication would proceed similarly to the sequence shown in FIG. 13.

In this case, however, it is assumed that endpoint device 109 once again fails to receive the new token and continues to store token pair (2222, 1111) at 1214h. Token states for tokens 1111, 2222, and 4444 in token state table 1212j are not updated since no confirmation was received by authentication server 102. At event 1420, endpoint device 109 authenticates a fourth time, again reusing stored token pair 1214k (2222, 1111). Authentication server determines that the tokens have an valid pair state of Exhausting+Exhausted (per table 1212j), and retains that token state as shown at 1212k. Authentication server 102 generates a new token 5555 in the Vended state and sends it to endpoint device 109. Thus, missing receipt of a new token (or token pair) is a recoverable error condition. It should be understood that any tokens that are vended but not received (e.g., tokens 3333 and 4444 in this example) may remain in the Vended state indefinitely. In an alternative embodiment, a token that is vended but never received (e.g., token 3333 at token table 1212j) can be re-sent in response to a subsequent authentication by the endpoint device to which the token was vended, rather than generating a new token. In this case, authentication server 102 would need to keep track of the particular endpoint device to which a token in the Vended state had been vended.

It will be appreciated that the event sequences of FIGS. 12-14 are illustrative and that variations and modifications are possible. Token structures and lengths can be varied. Events can occur in a different order from that shown.

While the invention has been described with respect to specific embodiments, one skilled in the art will recognize that numerous modifications are possible. For instance, in embodiments described above, endpoint device 109 is described as storing a token pair in which tokens can be stored and updated individually, by replacing the older token of the pair with a newly received token. However, it will be appreciated that in processes described above, tokens are only read by authentication server 102, and token content can therefore be opaque to all other entities, which can treat the tokens as a single "token blob" that contains the two tokens. In some embodiments, the token blob can also contain other information such as a timestamp, an identifier of the entity that created the token blob, or the like. If desired, the token blob can be encrypted by authentication server 102; as long as authentication server 102 is the only entity that needs to read or interpret tokens, the encryption key for token blobs can be a key known only to authentication server 102. When endpoint device 109 presents its stored token blob, authentication server 102 can use its key to decrypt the token blob and extract the new tokens. After successful authentication, authentication server 102 can generate a new token blob containing the newer token from the received token blob and a newly generated token and send the new token blob to grantor device 110, which can forward the token blob to endpoint device 109. Use of encryption for token blobs, although not required, can provide additional assurance that a token blob presented during an authentication process was created by authentication server 102. In still other embodiments, provisioning server 106 can create an initial token blob for an endpoint device, e.g., during process 600; this initial token blob can be encrypted using a key known to provisioning server 106, as long as authentication server 102 has the corresponding decryption key (which can be the same key).

In some embodiments, a newly generated token or token blob can be digitally signed by authentication server 102 prior to sending it to an endpoint device, and verification of an authentication request (e.g., at block 712 of process 700) can include verifying the digital signature on the received token or token blob.

As noted above, in some embodiments, each token can contain information such as when the token was generated, the identity of provisioning server 106, the identity of authentication server 102, or the like. In some embodiments each token can also encode information about the particular endpoint device for which it is intended, e.g., using bits in a structured field. The information may include, e.g., identification of a manufacturer of the endpoint device, a make and/or model name of the endpoint device, or the like. During authentication (e.g., at block 712 of process 700), authentication server 102 can extract the encoded information about the endpoint device from the received token pair and send the encoded information back to grantor device 110. Grantor device 110 can present the information to a user of grantor device 110 and prompt the user to confirm that the authentication of endpoint device 109 should proceed. If the user does not confirm, grantor device 110 can cancel the authentication operation without authenticating endpoint device 109 and can notify authentication server 102 that the authentication was cancelled by the user.

As noted above, some error conditions can be recoverable, allowing an endpoint device to authenticate again after a communication is missed. In some instances, an "unrecoverable" error may occur, e.g., if the endpoint device loses its token pair or if a token in the token pair is revoked by the authentication server. To regain the ability to authenticate after an unrecoverable error, the endpoint device would need to reestablish a valid token pair, e.g., by communicating with provisioning server 106 to obtain a new initial token pair.

In embodiments described above, a token remains in the Registered state until it is used for authentication, at which time it is updated to the Exhausting state. Some embodiments may provide "N-time-use" tokens, where a token can remain in the Registered state through some number (N) of authentications. A counter associated with the Registered token can be incremented each time the token is presented during a successful authentication while keeping the token in the Registered state. When the counter reaches the limit N, the token state can be changed to Exhausting and a new token can be sent to the endpoint device. Counters can also be applied to other states, e.g., to limit the number of times a particular token can be presented in the Exhausting state; when the counter reaches its limit, the token state can be changed to Exhausted.

The token status data store can be persistent storage, and tokens can be stored in the token status data store indefinitely. In some embodiments, tokens can live "forever" (in the sense that no tokens are intentionally removed from the token status data store). In other embodiments, tokens may have a finite lifetime. For instance, tokens in the Vended or Registered state may expire after some period of time (e.g., a month, a year, five years, or the like). Expiration conditions, or lack of same, can be chosen based on desired behavior. For instance, if it is expected that authentication of a particular endpoint device by the authentication server will occur infrequently and may occur months or years after a token is provided to the endpoint device, a long (or open-ended) lifetime may be preferred. If it is expected that authentication will occur within a specific time frame after providing a token, an expiration date may be desirable. Expired tokens can be removed from the token status data store (which may result in regenerating the same token) or remain in the token status data store in an Expired or Revoked state.

Use of a null token during initial provisioning and authentication is also optional. In some alternative embodiments, an endpoint device can be initially provisioned with a single token, and the authentication server can treat a single token in the Registered state as a valid token pair.

In embodiments described above, the authentication server keeps track of the state of each token but need not keep track of when or to what device a particular token was vended. Such information can be tracked if desired for additional security.

Embodiments of the present invention can be implemented in any scenario where authentication of an endpoint device by a grantor device is desired. In one scenario, the grantor device can be a user device (e.g., mobile phone, tablet, or other user-operable computer system) that is configured to control various accessory devices that are installed in an environment the user frequents. Examples include "smart home" accessories such as lamps, window shades, thermostats, appliances, door locks, or the like, that are configured to communicate wirelessly with the user device. Authentication may be desired when a new accessory is being added to the environment. In this scenario, the accessory can act as the endpoint device, and the user device can act as the grantor device. Using processes as described above, a manufacturer of accessories can operate a provisioning server that provisions each accessory with an initial token pair, either at the factory or via a firmware update. When the accessory is being added to the smart home environment, the user device can obtain the token pair from the accessory and send it to an authentication server operated by a manufacturer of the user device (or distributor of the smart-home software executing on the user device). The authentication server can use the token pair to authenticate the accessory to the user device in the manner described above. As noted above, once the accessory has been authenticated, the accessory and the user device can generate a shared secret that can be used for identity verification in subsequent communication, without requiring further involvement of the authentication server. As long as the accessory continues to store a valid token pair after authentication, the accessory can be re-authenticated at the authentication server in the event that the shared secret is compromised or lost.

Embodiments described above contemplate that the authentication server performs authentication of an endpoint device at the request of a grantor device that is determining whether to allow the endpoint device to access protected functionality of the grantor device. Those skilled in the art with access to the present disclosure will appreciate that protected functionality can be implemented at the same computer system that implements authentication server 102, and a separate grantor device need not be involved. Instead, an endpoint device (e.g., endpoint device 108 of FIG. 1) can communicate with authentication server 102 via network 104 to perform authentication similar to the process described above with reference to FIGS. 7A and 7B, with the operations of grantor device 110 being instead executed by authentication server 102.

Similarly, embodiments described above also contemplate that initial provision of tokens to an endpoint device would be performed by a provisioning server and that the authentication server and provisioning server can be operated by different entities. This, however, is not required; the authentication server and provisioning server can be operated by the same entity and can be implemented at the same computer system.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may include an internal storage medium of a compatible electronic device and/or external storage media readable by the electronic device that can execute the code. In some instances, program code can be supplied to the electronic device via Internet download or other transmission paths.

Thus, although the invention has been described with respect to specific embodiments, it will be appreciated that the invention is intended to cover all modifications and equivalents within the scope of the following claims.

What is claimed is:

1. A method executed by an authentication server to authenticate an endpoint device to a grantor device, the method comprising:

maintaining a token status data store that stores a plurality of tokens that have been vended to endpoint devices, the token status data store including a current state for each of the tokens, a respective current state for each token being selected from a set of states that includes a plurality of states forming a normal state sequence, wherein the normal state sequence includes:
 a first state for tokens that have been vended from the authentication server;
 a second state for tokens that have been confirmed as received by the endpoint device;
 a third state for tokens that have been presented by the endpoint device in a successful authentication request; and
 a fourth state for tokens for which receipt of a subsequent token by the endpoint device has been confirmed;

receiving an authentication request from the grantor device, the authentication request including a token pair provided by the endpoint device to the grantor device, the token pair including a first token and a second token;

determining a pair state for the token pair based on the respective current state for each of the first token and the second token in the token status data store;

determining, based at least in part on the pair state, whether the authentication request succeeds or fails, wherein determining whether the authentication request succeeds or fails includes:
 determining whether the first token is in the first state and the second token is in the third state, wherein the authentication request succeeds if the first token is in the first state and the second token is in the third state; and
 determining whether the first token is in the second state and the second token is in the fourth state, wherein the authentication request succeeds if the first token is in the second state and the second token is in the fourth state;

in response to determining that the authentication request succeeds:
 updating the respective current state for each of the first token and the second token such that the respective current state for each of the first token and the second token advances to a next state in the normal state sequence;
 generating a third token in the first state of the normal state sequence;
 sending a response to the grantor device indicating that the authentication request succeeded, the response including the third token; and
 in response to a confirmation message indicating that the endpoint device received the third token, updating the token status data store such that the current state for the third token and a newer token of the first token and the second token each advance to a next state in the normal state sequence; and in response to determining that the authentication request fails:

sending a response to the grantor device indicating that the authentication request failed.

2. The method of claim 1 wherein the token pair is received as an encrypted token blob and wherein determining the pair state includes decrypting the encrypted token blob to produce a decrypted token blob and extracting the first token and the second token from the decrypted token blob.

3. The method of claim 1 wherein determining whether the authentication request succeeds further includes:
determining whether the first token is in the third state and the second token is in the fourth state, wherein the authentication request succeeds if the first token is in the third state and the second token is in the fourth state.

4. The method of claim 1 wherein determining whether the authentication request succeeds further includes:
determining whether the first token is in the second state and the second token is in a null state, wherein the authentication request succeeds if the first token is in the second state and the second token is in the null state.

5. The method of claim 1 further comprising, in response to determining that the authentication request failed:
updating the state of at least one of the first token or the second token to a revoked state.

6. A computer system comprising:
a network interface to receive requests including an authentication request sent by a grantor device to authenticate an endpoint device and to communicate responses to received requests;
a non-transitory storage subsystem to store data including a token status table that stores a plurality of tokens that have been vended to endpoint devices, the token status table including a current state for each of the tokens, a respective current state for each token being selected from a set of predefined states that includes a plurality of states forming a normal state sequence, wherein the normal state sequence includes:
a first state for tokens that have been vended from the computer system;
a second state for tokens that have been confirmed as received by the endpoint device;
a third state for tokens that have been presented by the endpoint device in a successful authentication request; and
a fourth state for tokens for which receipt of a subsequent token by the endpoint device has been confirmed; and
a processing subsystem coupled to the network interface and the storage subsystem, the processing subsystem including one or more processors configured to:
receive the authentication request, the authentication request including a token pair provided by the endpoint device to the grantor device, the token pair including a first token and a second token;
determine a pair state for the token pair based on a respective current state for each of the first token and the second token in the token status table;
determine, based at least in part on the pair state, whether the authentication request succeeds or fails, wherein determining whether the authentication request succeeds or fails includes:
determining whether the first token is in the first state and the second token is in the third state, wherein the authentication request succeeds if the first token is in the first state and the second token is in the third state; and
determining whether the first token is in the second state and the second token is in the fourth state, wherein the authentication request succeeds if the first token is in the second state and the second token is in the fourth state;
in response to determining that the authentication request succeeds:
update the respective current state for each of the first token and the second token such that the respective current state for each of the first token and the second token advances to a next state in the normal state sequence;
generate a third token in the first state of the normal state sequence;
send a response to the grantor device indicating that the authentication request succeeded, the response including the third token; and
in response to a confirmation message indicating that the endpoint device received the third token, update the token status table such that the current state for the third token and a newer token of the first token and the second token each advance to a next state i the normal state sequence; and
in response to determining that the authentication request fails:
send a response to the grantor device indicating that the authentication request failed.

7. The computer system of claim 6 wherein the token pair is received as an encrypted token blob and wherein the one or more processors are further configured such that determining the pair state includes decrypting the encrypted token blob to produce a decrypted token blob and extracting the first token and the second token from the decrypted token blob.

8. The computer system of claim 6 wherein the one or more processors are further configured such that determining whether the authentication request succeeds further includes:
determining whether the first token is in the third state and the second token is in the fourth state, wherein the authentication request succeeds if the first token is in the third state and the second token is in the fourth state.

9. The computer system of claim 6 wherein the requests received by the network interface further include a request for new tokens sent by a provisioning server and wherein the one or more processors are further configured to:
generate one or more new tokens in response to the request for new tokens;
add the one or more new tokens to the token status table in the first state of the normal state sequence; and
send the one or more new tokens to the provisioning server.

10. The computer system of claim 9 wherein the one or more processors are further configured to:
receive a report from the provisioning server indicating whether each of the one or more new tokens was provided to another device; and
update the token status table based on the report.

11. A non-transitory computer-readable storage medium having storing therein program code that, when executed by an authentication server, causes the authentication server to perform a method comprising:
maintaining a token status data store that stores a plurality of tokens that have been vended to endpoint devices, the token status data store including a current state for each of the tokens, the respective current state for each token being selected from a set of predefined states that includes a plurality of states forming a normal state sequence, wherein the normal state sequence includes:
- a first state for tokens that have been vended from the authentication server;
- a second state for tokens that have been confirmed as received by the endpoint device;
- a third state for tokens that have been presented by the endpoint device in a successful authentication request; and
- a fourth state for tokens for which receipt of a subsequent token by the endpoint device has been confirmed;

receiving, from a grantor device, an authentication request to authenticate an endpoint device, the authentication request including a token pair provided by the endpoint device, the token pair including a first token and a second token;

determining a pair state for the token pair based on the respective current state for each of the first token and the second token in the token status data store;

determining, based at least in part on the pair state, whether the authentication request succeeds or fails, wherein determining whether the authentication request succeeds or fails includes:
- determining whether the first token is in the first state and the second token is in the third state, wherein the authentication request succeeds if the first token is in the first state and the second token is in the third state; and
- determining whether the first token is in the second state and the second token is in the fourth state, wherein the authentication request succeeds if the first token is in the second state and the second token is in the fourth state;

in response to determining that the authentication request succeeds:
- updating the respective current state for each of the first token and the second token such that the respective current state for each of the first token and the second token advances to a next state in the normal state sequence;
- generating a third token in the first state of the normal state sequence;
- sending a response to the grantor device indicating that the authentication request succeeded, the response including the third token; and
- in response to a confirmation message indicating that the endpoint device received the third token, updating the token status data store such that the current state for the third token and a newer token of the first token and the second token each advance to a next state in the normal state sequence; and in response to determining that the authentication request fails:
- sending a response to the grantor device indicating that the authentication request failed.

12. The non-transitory computer-readable storage medium of claim 11 wherein the authentication request is received from a grantor device communicatively coupled to the endpoint device.

13. The non-transitory computer-readable storage medium of claim 11 wherein determining whether the authentication request succeeds further includes:
- determining whether the first token is in the third state and the second token is in the fourth state, wherein the authentication request succeeds if the first token is in the third state and the second token is in the fourth state.

14. The non-transitory computer-readable storage medium of claim 11 wherein the method further comprises:
- receiving a request for new tokens from a provisioning server;
- generating one or more new tokens in response to the request for new tokens;
- adding the one or more new tokens to the token status data store in the first state of the normal state sequence; and
- sending the one or more new tokens to the provisioning server.

* * * * *

UNITED STATES PATENT AND TRADEMARK OFFICE
CERTIFICATE OF CORRECTION

PATENT NO. : 10,999,074 B2
APPLICATION NO. : 16/051040
DATED : May 4, 2021
INVENTOR(S) : Carmen A. Bovalino, III et al.

Page 1 of 1

It is certified that error appears in the above-identified patent and that said Letters Patent is hereby corrected as shown below:

In the Claims

Column 26, Line 23 Claim 6, delete "next state i the" and insert --next state in the--.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*